US011197010B2

(12) United States Patent
Sun et al.

(10) Patent No.: US 11,197,010 B2
(45) Date of Patent: Dec. 7, 2021

(54) BROWSER-BASED VIDEO DECODER USING MULTIPLE CPU THREADS

(71) Applicant: Microsoft Technology Licensing, LLC, Redmond, WA (US)

(72) Inventors: Jingyaw Sun, San Jose, CA (US); Winston M. P. Johnston, San Mateo, CA (US); Jayashree Sadagopan, Bellevue, WA (US); Lihua Zhu, Shanghai (CN); Michael E. Seydl, Redmond, WA (US); Olof L. E. Mases, Sunnyvale, CA (US); B. Anil Kumar, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/289,111

(22) Filed: Oct. 7, 2016

(65) Prior Publication Data
US 2018/0103261 A1 Apr. 12, 2018

(51) Int. Cl.
*H04N 19/44* (2014.01)
*H04N 19/127* (2014.01)
(Continued)

(52) U.S. Cl.
CPC ............. *H04N 19/44* (2014.11); *G06T 1/20* (2013.01); *H04N 19/124* (2014.11);
(Continued)

(58) Field of Classification Search
CPC ...... H04N 19/124; H04N 19/44; H04N 19/51; H04N 19/436; H04N 19/127; H04N 19/42; H04N 19/60; G06T 1/20
See application file for complete search history.

(56) References Cited

U.S. PATENT DOCUMENTS 5,778,098 A 7/1998 Lee et al.
7,362,804 B2 4/2008 Novotny et al.
(Continued)

FOREIGN PATENT DOCUMENTS

CN 101123723 2/2008
CN 102254297 11/2013
(Continued)

OTHER PUBLICATIONS

Anonymous, "Point Sprites (Direct3D 9)," downloaded from the World Wide Web on Apr. 12, 2016, 3 pp.
(Continued)

*Primary Examiner* — Neil R Mikeska
(74) *Attorney, Agent, or Firm* — Klarquist Sparkman, LLP

(57) ABSTRACT

Innovations in video playback using a browser-based video decoder are described. In a computer system that includes multiple central processing units ("CPUs"), a browser-based video decoder performs operations with multiple threads that may execute simultaneously on different CPUs. The video decoder can perform decoding operations in parallel for different sections of a picture. For example, with a main CPU thread associated with a browser, the video decoder performs a first decoding workload (e.g., bitstream parsing) for a picture. With auxiliary CPU threads associated with Web workers and simultaneously executing on different CPUs, the video decoder performs a second decoding workload (e.g., entropy decoding, decoding of side information) for different sections of the picture, one section per auxiliary CPU thread. If the computer system also includes a graphics processing unit ("GPU"), the video decoder can perform additional decoding workloads with shader routines executable on the GPU.

26 Claims, 15 Drawing Sheets software 180 implementing one or more innovations for browser-based video decoding using multiple CPU threads

(51) Int. Cl.
  *H04N 19/42*  (2014.01)
  *H04N 19/436* (2014.01)
  *H04N 19/124* (2014.01)
  *H04N 19/51*  (2014.01)
  *H04N 19/60*  (2014.01)
  *G06T 1/20*   (2006.01)

(52) U.S. Cl.
  CPC ........... *H04N 19/127* (2014.11); *H04N 19/42* (2014.11); *H04N 19/436* (2014.11); *H04N 19/51* (2014.11); *H04N 19/60* (2014.11)

(56) References Cited

U.S. PATENT DOCUMENTS

| | | | |
|---|---|---|---|
| 7,565,021 | B2 | 7/2009 | Feng et al. |
| 7,646,815 | B2 | 1/2010 | Dattani et al. |
| 7,646,817 | B2 | 1/2010 | Shen et al. |
| 7,885,336 | B2 | 2/2011 | Wong et al. |
| 8,074,248 | B2* | 12/2011 | Sigmon, Jr. ....... G06F 17/30905 725/110 |
| 8,180,165 | B2 | 5/2012 | Lu et al. |
| 8,233,527 | B2 | 7/2012 | Schmit et al. |
| 8,363,730 | B2 | 1/2013 | Saxena et al. |
| 8,411,734 | B2 | 4/2013 | Zhao et al. |
| 8,457,434 | B2 | 6/2013 | Zhu et al. |
| 8,542,745 | B2 | 9/2013 | Zhang et al. |
| 8,681,162 | B2 | 3/2014 | Paltashev et al. |
| 8,732,474 | B1 | 5/2014 | Perry et al. |
| 8,773,443 | B2 | 7/2014 | Diard |
| 8,804,831 | B2 | 8/2014 | Karczewicz et al. |
| 8,817,179 | B2 | 8/2014 | Zhu et al. |
| 8,913,068 | B1* | 12/2014 | Kokkevis .......... G06F 17/30058 345/522 |
| 8,929,459 | B2 | 1/2015 | Massimino |
| 9,300,976 | B2 | 3/2016 | Fuldseth |
| 9,563,928 | B1* | 2/2017 | Sokolowski ............... G06T 1/20 |
| 9,563,929 | B1* | 2/2017 | Sokolowski ............... G06T 1/20 |
| 9,665,972 | B2* | 5/2017 | Block ...................... G06T 15/80 |
| 9,710,509 | B2* | 7/2017 | Song ...................... G06F 9/5027 |
| 9,720,888 | B1* | 8/2017 | Jain ...................... G06F 17/2247 |
| 2004/0076333 | A1 | 4/2004 | Zhang et al. |
| 2004/0190617 | A1 | 9/2004 | Shen et al. |
| 2007/0018979 | A1 | 1/2007 | Budagavi |
| 2007/0291858 | A1 | 12/2007 | Hussain et al. |
| 2008/0084932 | A1 | 4/2008 | Wang et al. |
| 2008/0273028 | A1 | 11/2008 | Jiao et al. |
| 2008/0310509 | A1 | 12/2008 | Goel |
| 2009/0002379 | A1* | 1/2009 | Baeza ...................... G06T 1/20 345/522 |
| 2009/0110310 | A1* | 4/2009 | Kodama ............. H04N 19/647 382/233 |
| 2009/0160865 | A1 | 6/2009 | Grossman |
| 2009/0305790 | A1* | 12/2009 | Lu ........................ G06T 15/005 463/42 |
| 2010/0077058 | A1* | 3/2010 | Messer .................... G06F 9/452 709/219 |
| 2010/0118038 | A1* | 5/2010 | Labour ................... G06F 21/53 345/522 |
| 2010/0135418 | A1 | 6/2010 | Zhang et al. |
| 2010/0146523 | A1* | 6/2010 | Brigaut ............. G06F 17/30203 719/330 |
| 2012/0031482 | A1 | 2/2012 | Vanecek et al. |
| 2012/0092353 | A1 | 4/2012 | Paltashev et al. |
| 2012/0093214 | A1* | 4/2012 | Urbach ............... G06F 17/2247 375/240.01 |
| 2012/0260181 | A1 | 10/2012 | Sule et al. |
| 2012/0317236 | A1 | 12/2012 | Abdo et al. |
| 2013/0044260 | A1 | 2/2013 | Vestergaard et al. |
| 2013/0044805 | A1 | 2/2013 | Vestergaard et al. |
| 2013/0047074 | A1* | 2/2013 | Vestergaard ............. G06F 3/14 715/234 |
| 2013/0051478 | A1 | 2/2013 | Wu et al. |
| 2013/0128966 | A1 | 5/2013 | Gao et al. |
| 2014/0053059 | A1* | 2/2014 | Weber ................ G06F 9/45529 715/234 |
| 2014/0105272 | A1 | 4/2014 | Bulusu et al. |
| 2014/0192893 | A1 | 7/2014 | Sullivan et al. |
| 2014/0254671 | A1 | 9/2014 | Misra et al. |
| 2014/0368516 | A1 | 12/2014 | Taggart et al. |
| 2015/0023409 | A1 | 1/2015 | Schierl et al. |
| 2015/0088977 | A1 | 3/2015 | Monesson |
| 2015/0110172 | A1 | 4/2015 | Ye et al. |
| 2015/0208084 | A1 | 7/2015 | Zhu et al. |
| 2017/0132178 | A1 | 5/2017 | Ramachandran |
| 2017/0295379 | A1 | 10/2017 | Sun et al. |
| 2017/0300312 | A1 | 10/2017 | Aharon et al. |
| 2017/0372494 | A1* | 12/2017 | Zhu .......................... G06T 9/00 |
| 2018/0063540 | A1 | 3/2018 | Zhu et al. |
| 2018/0091764 | A1 | 3/2018 | Aharon et al. |
| 2018/0152699 | A1 | 5/2018 | Kumar et al. |
| 2018/0324238 | A1* | 11/2018 | Melenboim ......... H04L 65/4084 |

FOREIGN PATENT DOCUMENTS

| | | |
|---|---|---|
| EP | 2034439 | 3/2009 |
| WO | WO 2007/093629 | 8/2007 |

OTHER PUBLICATIONS

Ebrahimi et al., "MPEG-4 Natural Video Coding—An overview," *Journal of Signal Processing: Image Communication*, vol. 15, No. 4-5, 33 pp. (Jan. 2000).

Han et al., "Efficient Video Decoding on GPUs by Point Based Rendering," *Proc. ACM SIGGRAPH/Eurographics Symp. on Graphics Hardware*, PowerPoint presentation, 30 pp. (Sep. 2006).

Han et al., "Efficient Video Decoding on GPUs by Point Based Rendering," *Proc. ACM SIGGRAPH/Eurographics Symp. on Graphics Hardware*, 8 pp. (2006).

Hermans, "H.264/MPEG4_Advanced Video Coding," Seminar Report, Matriculation No. 284141 RWTH, 23 pp. (Sep. 2012).

ITU-T Recommendation H.264, "Advanced Video Coding for Generic Audiovisual Services," 680 pp. (Jan. 2012).

ITU-T Recommendation H.265, "High Efficiency Video Coding," 317 pp. (Apr. 2013).

Kamp et al., "Multihypothesis Prediction Using Decoder Side Motion Vector Derivation in Inter Frame Video Coding," *SPIE Visual Communications and Image Processing*, vol. 7257, 8 pp. (Jan. 2009).

Munshi, "OES_point_sprite," https://www.khronos.org/registry/gles/extensions/OES/OES_point_sprite.txt, 6 pp. (2004).

Munshi et al., "OpenGL® ES Common Profile Specification 2.0.24 (Difference Specification)," 81 pp. (2009).

Shen et al., "Accelerating Video Decoding Using GPU," *Int'l Conf. on Acoustics, Speech, and Signal Processing*, vol. 4, 4 pp. (Apr. 2003).

Sonnati, "H265—part I: Technical Overview," *Video Encoding & Streaming Technologies*, 7 pp. (Jun. 2014).

Cheung et al., "Highly Parallel Rate-Distortion Optimized Intra-Mode Decision on Multicore Graphics Processors," *IEEE Trans. on Circuits and Systems for Video Technology*, vol. 19, No. 11, pp. 1692-1703 (Nov. 2009).

Kalva et al., "Parallel Programming for Multimedia Applications," *Multimedia Tools and Applications*, vol. 51, Issue 2, pp. 801-818 (Jan. 2011).

W3C, "Web Workers," Editor's Draft, 27, Sep. 2016, 37 pp., downloaded from the World Wide Web on Oct. 10, 2016.

Web Hypertext Application Technology Working Group, "HTML Living Standard—Last Updated Oct. 10, 2016," Chapter 10, 43 pp., downloaded from the World Wide Web on Oct. 10, 2016.

Wikipedia, "Web Worker," 4 pp., downloaded from the World Wide Web on Oct. 10, 2016.

International Search Report and Written Opinion dated Oct. 25, 2017, from International Patent Application No. PCT/US2017/051967, 13 pp.

ISO/IEC, "Proposed Text for 14496-31 (VCB) CD," ISO/IEC JTC1/SC29/WG11 MPEG2014/M 33082, 95 pp. (Mar. 2014).

(56) References Cited

OTHER PUBLICATIONS

Notice of Allowance dated Apr. 12, 2018, from U.S. Appl. No. 15/192,827, 10 pp.
Office action dated Mar. 21, 2018, from U.S. Appl. No. 15/097,143, 14 pp.
Final Office Action dated Oct. 22, 2018, from U.S. Appl. No. 15/097,143, 13 pp.
Notice of Allowance dated Aug. 9, 2018, from U.S. Appl. No. 15/192,827, 7 pp.
Office action dated Apr. 1, 2019, from U.S. Appl. No. 15/097,143, 14 pp.
Notice of Allowance dated Oct. 18, 2019, from U.S. Appl. No. 15/097,143, 6 pp.

\* cited by examiner

FIG. 1
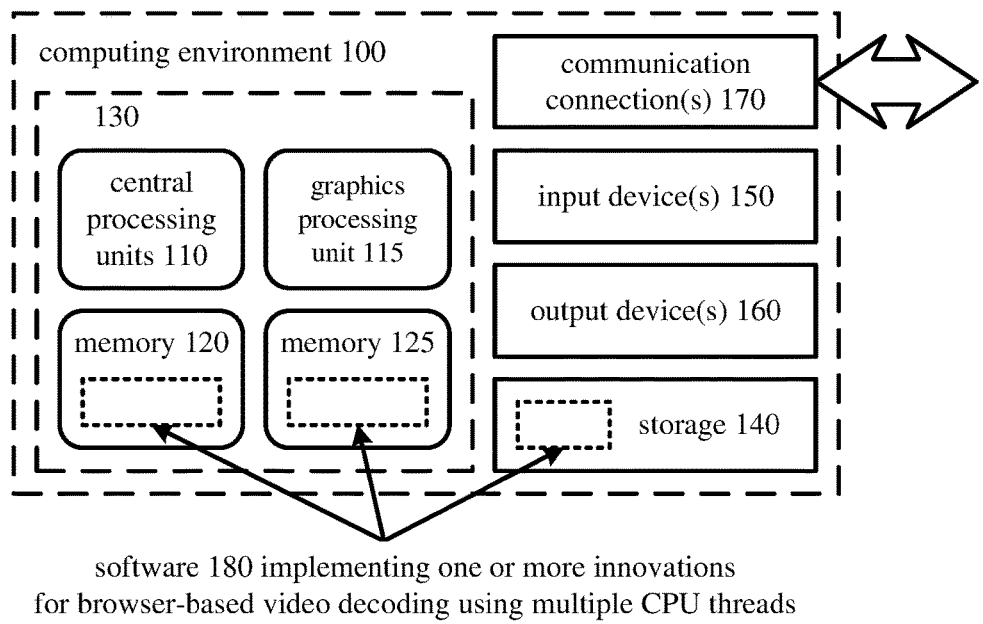
software 180 implementing one or more innovations
for browser-based video decoding using multiple CPU threads
FIG. 2     200
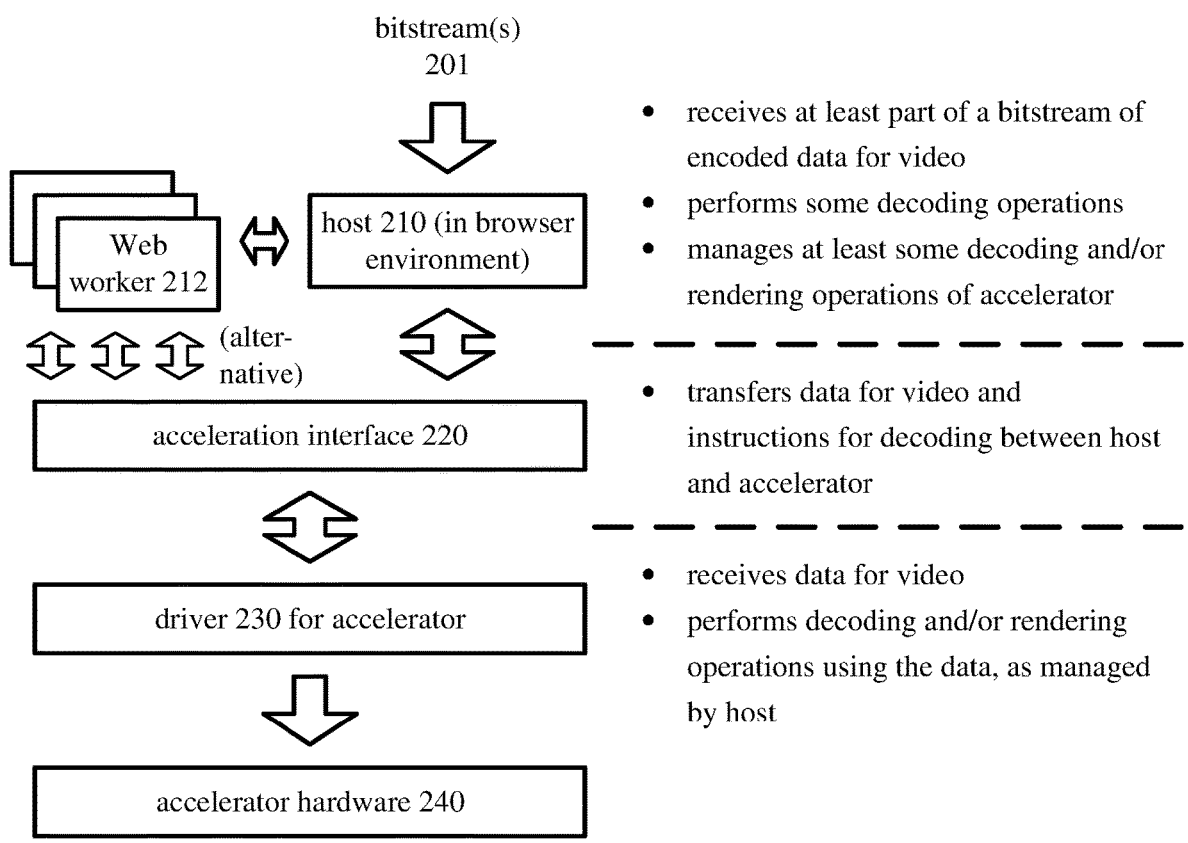

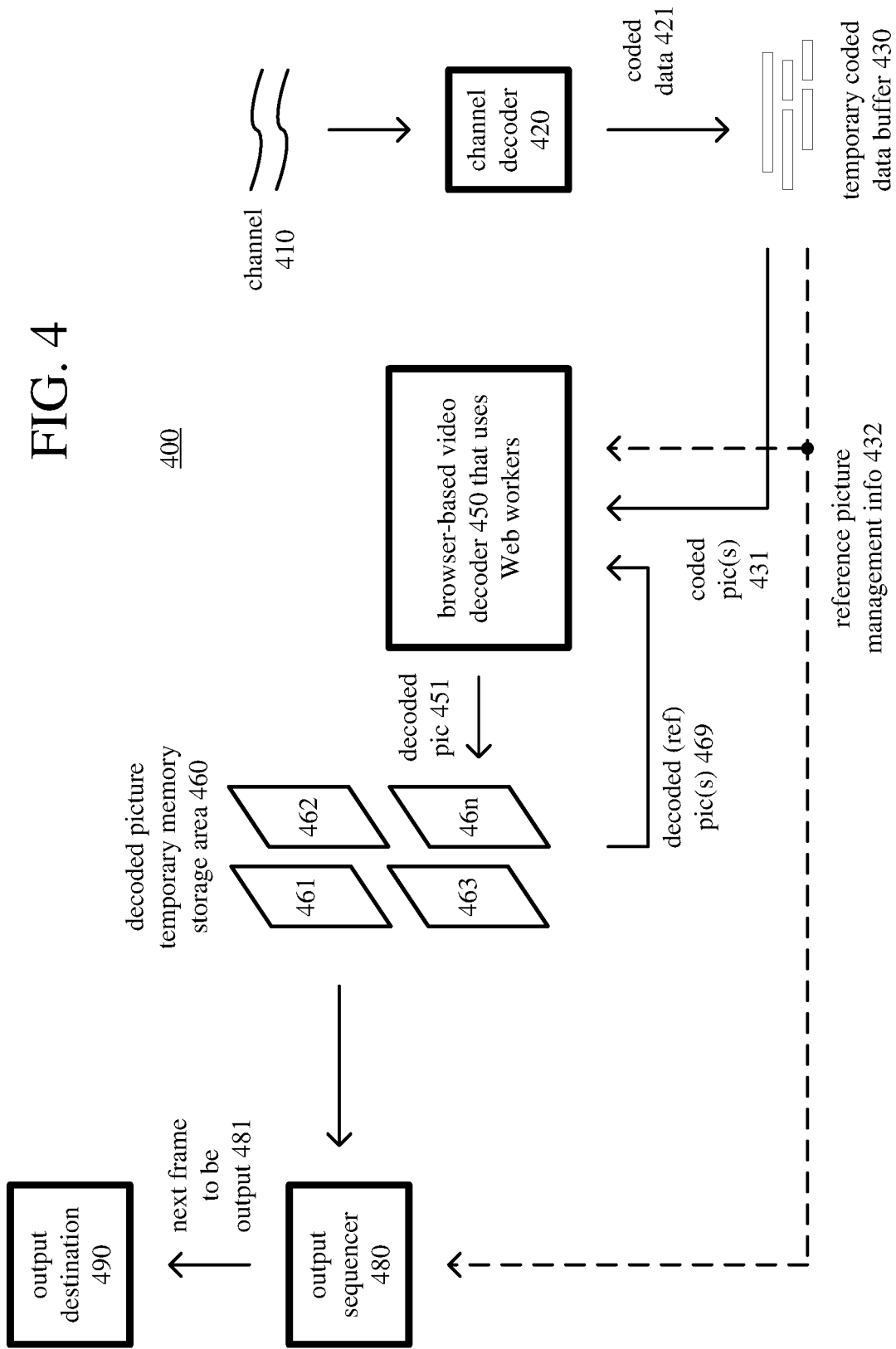

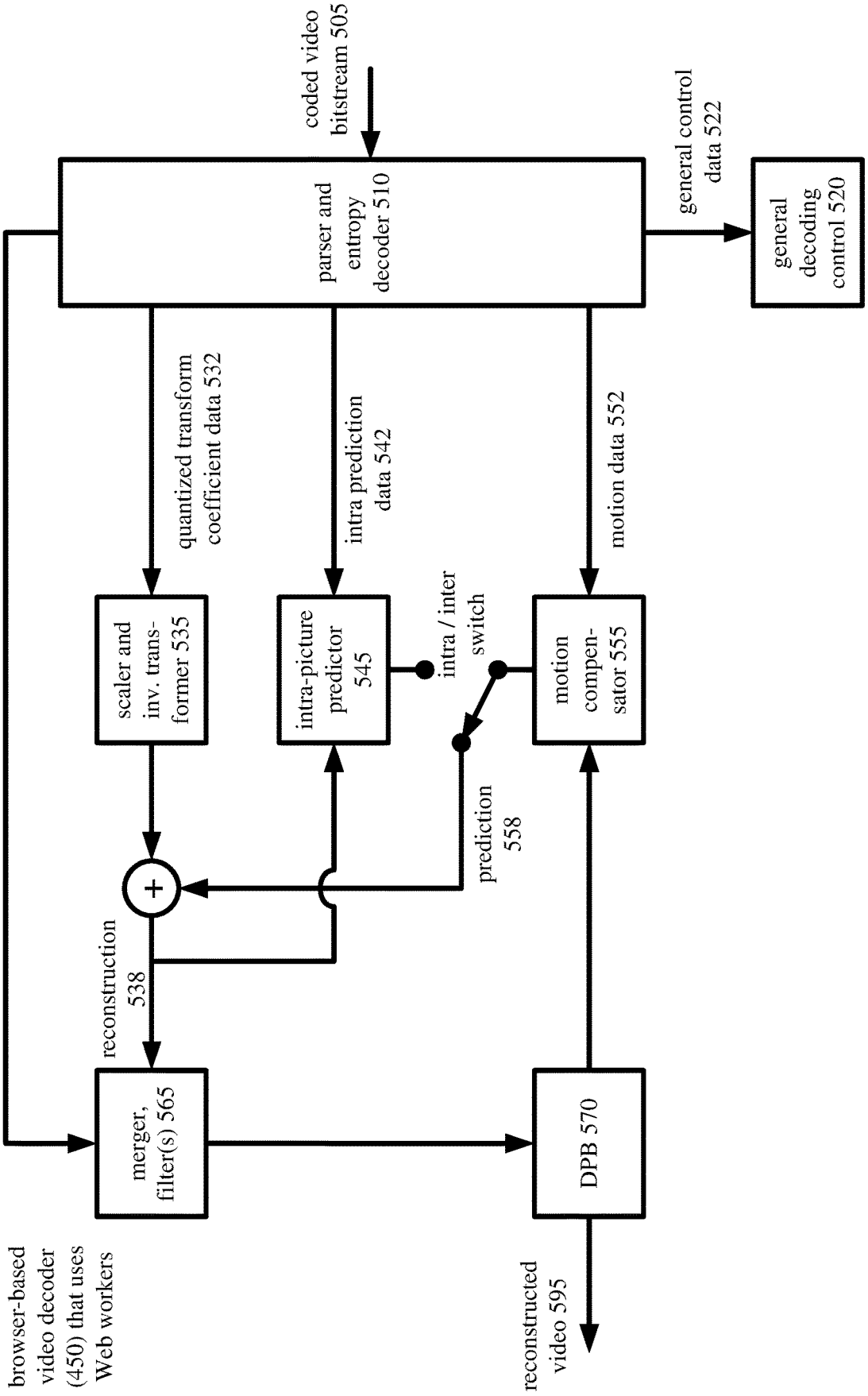

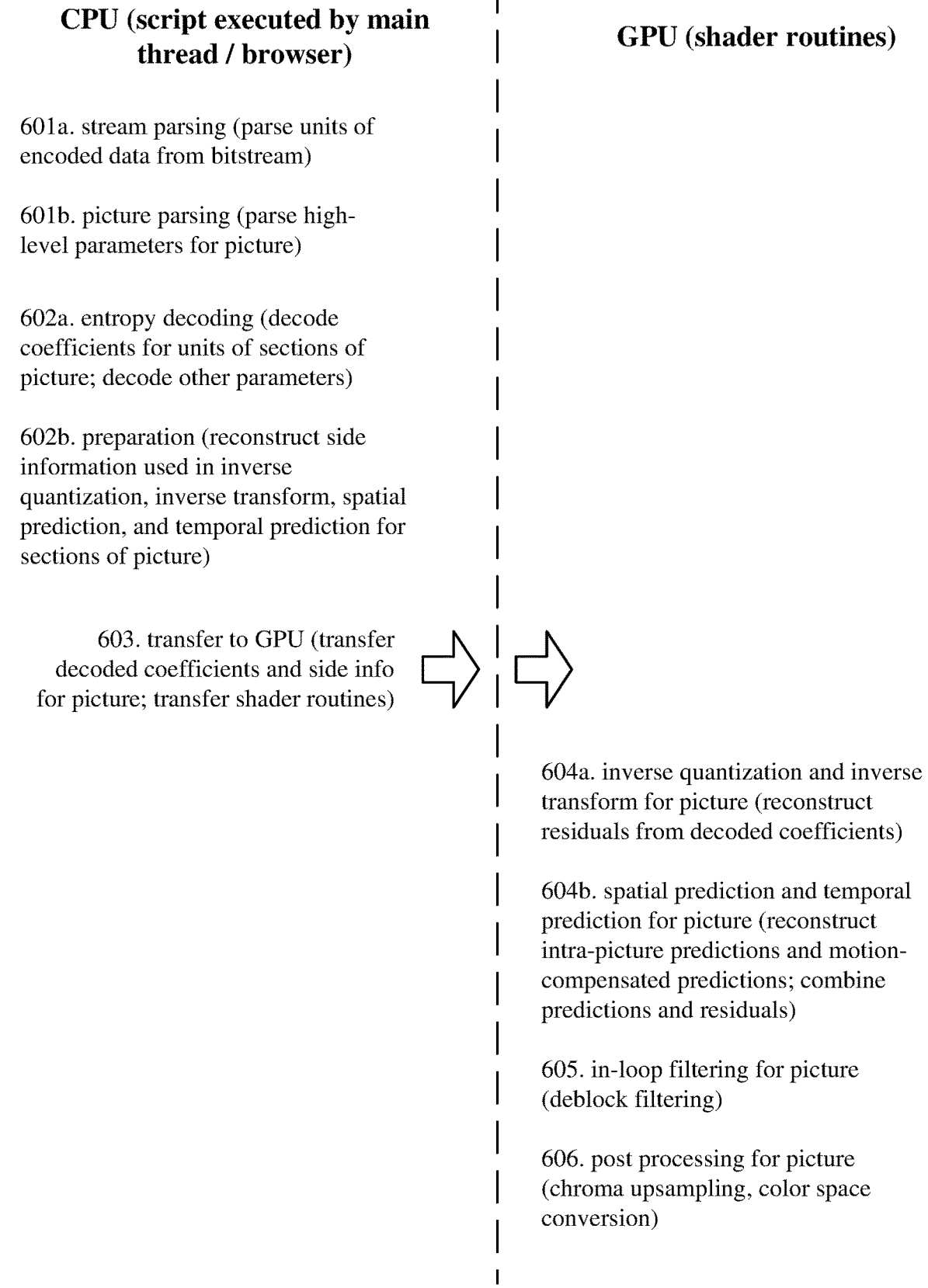

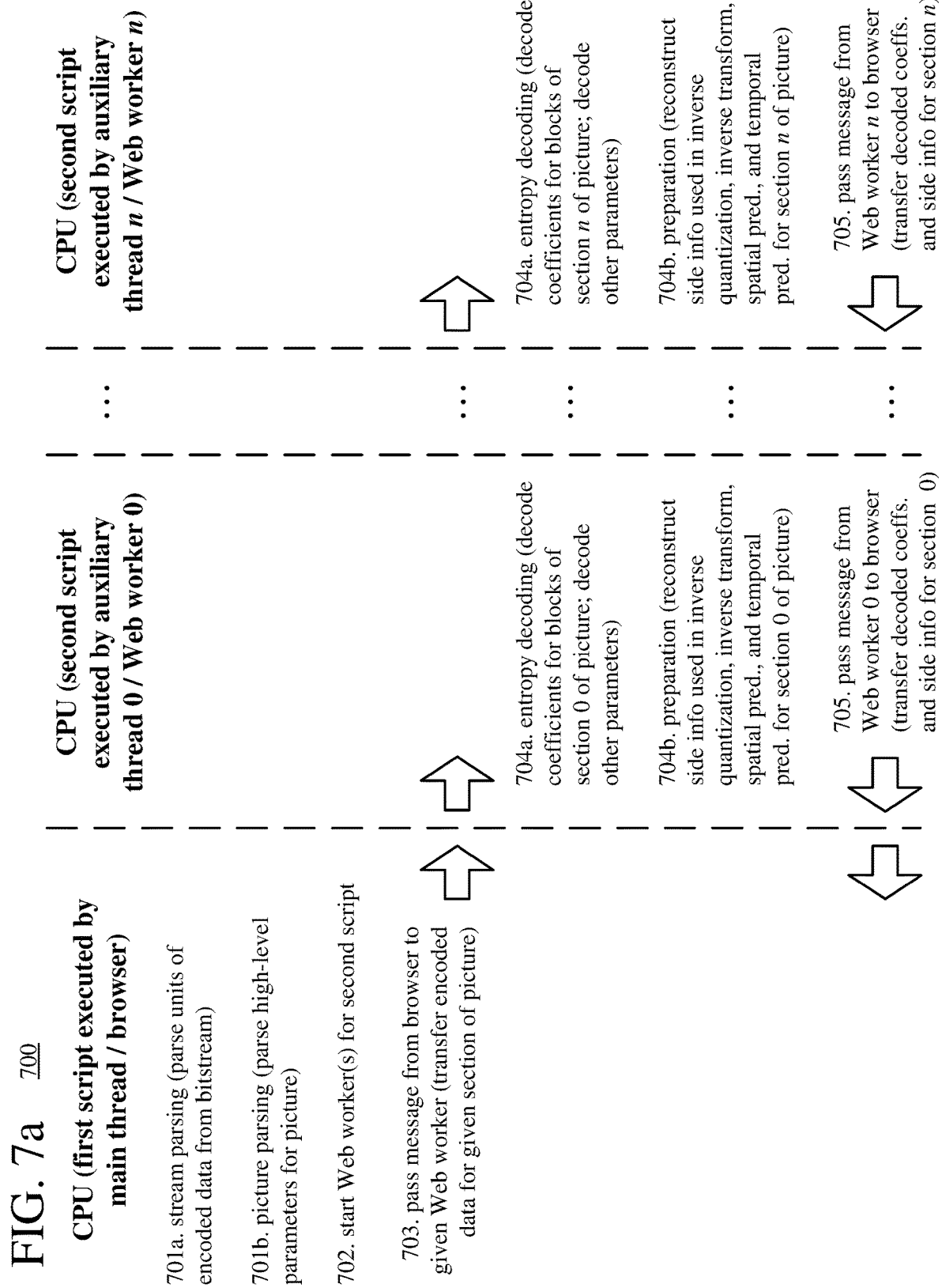

FIG. 7b  700 continued from FIG. 7a

CPU (first script executed by main thread / browser)

706. aggregate decoded coefficients and side info for different sections of picture 707. transfer to GPU (transfer decoded coefficients and side info for picture; transfer shader routines)

GPU (shader routines)

708a. inverse quantization and inverse transform for picture (reconstruct residuals from decoded coefficients)

708b. spatial prediction and temporal prediction for picture (reconstruct intra-picture predictions and inter-picture predictions; combine predictions and residuals)

709. in-loop filtering for picture (deblock filtering)

710. post processing for picture (chroma upsampling, color space conversion)

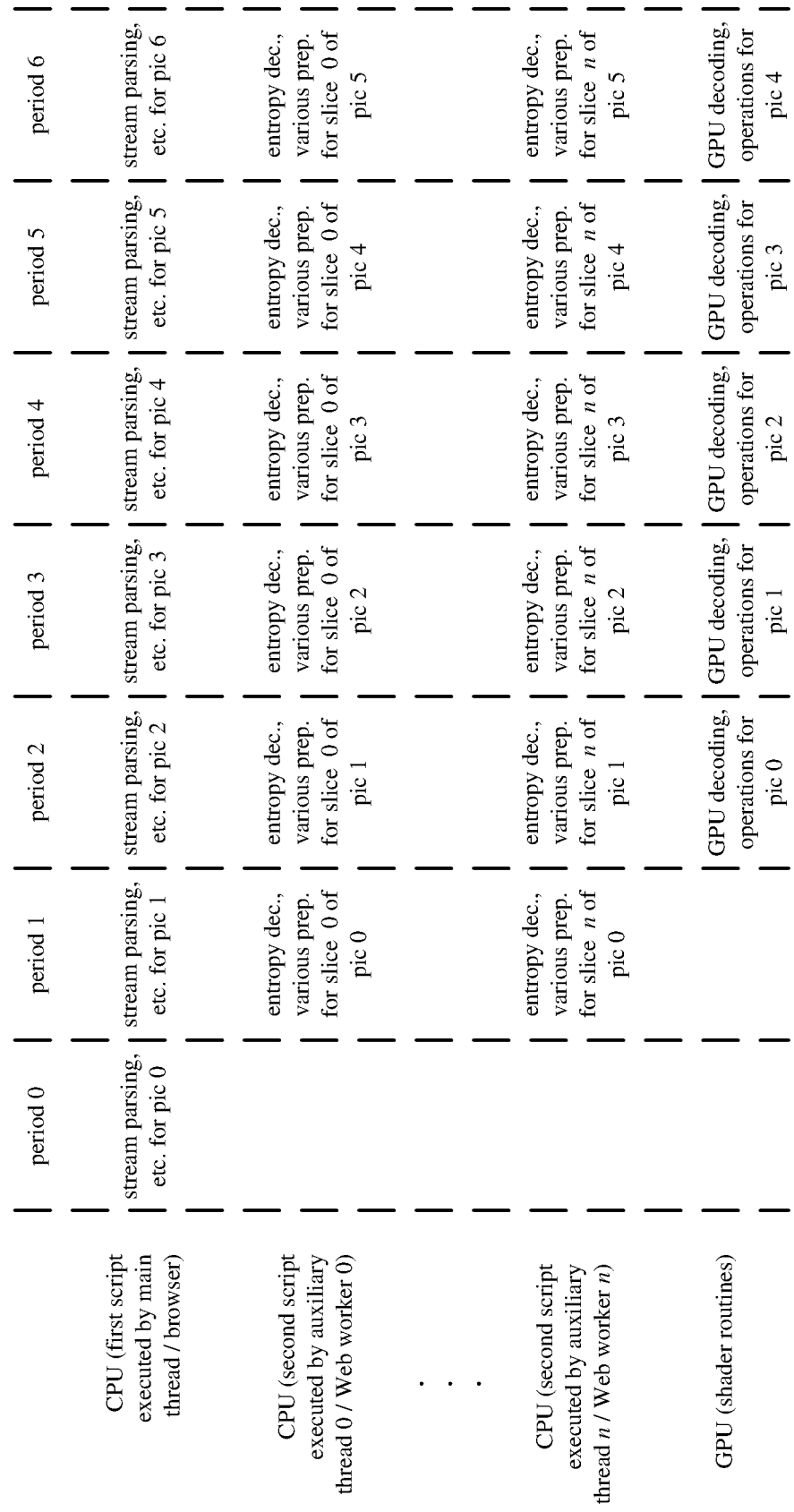

FIG. 9a  900

| CPU (first script executed by main thread / browser) | CPU (second script executed by auxiliary thread 0 / Web worker 0) | ... | CPU (second script executed by auxiliary thread n / Web worker n) |
|---|---|---|---|
| 901a. stream parsing (parse units of encoded data from bitstream) | | | |
| 901b. picture parsing (parse high-level parameters for picture) | | | |
| 902. start Web worker(s) for second script | | | |
| 903. pass message from browser to given Web worker (transfer encoded data for given section of picture) ⇧ | | ⇧ | |
| | 904a. entropy decoding (decode coefficients for blocks of section 0 of picture; decode other parameters) | ... | 904a. entropy decoding (decode coefficients for blocks of section n of picture; decode other parameters) |
| | 904b. preparation (reconstruct side info used in inverse quantization, inverse transform, spatial pred., and temporal pred. for section 0 of picture) | ... | 904b. preparation (reconstruct side info used in inverse quantization, inverse transform, spatial pred., and temporal pred. for section n of picture) |

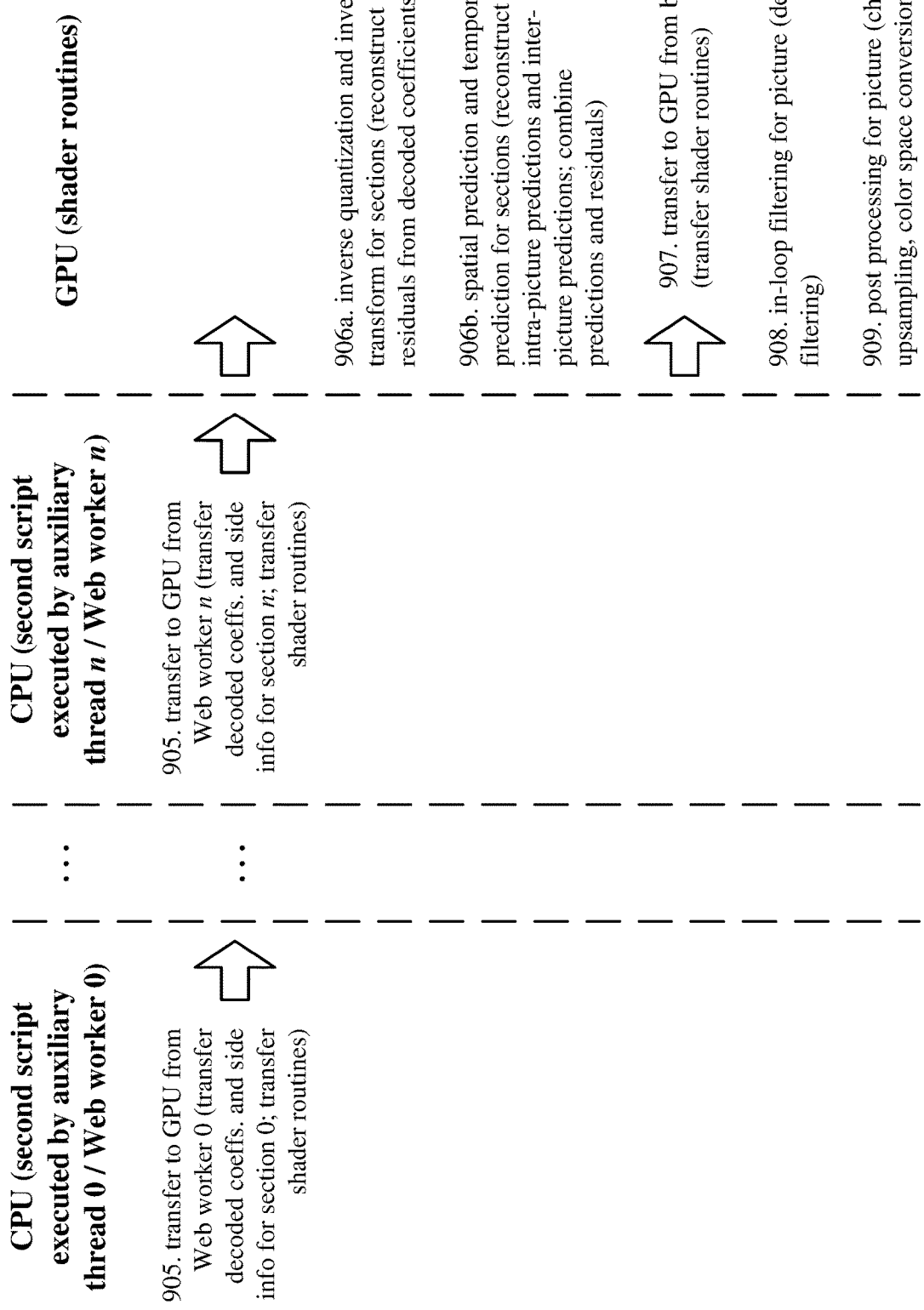

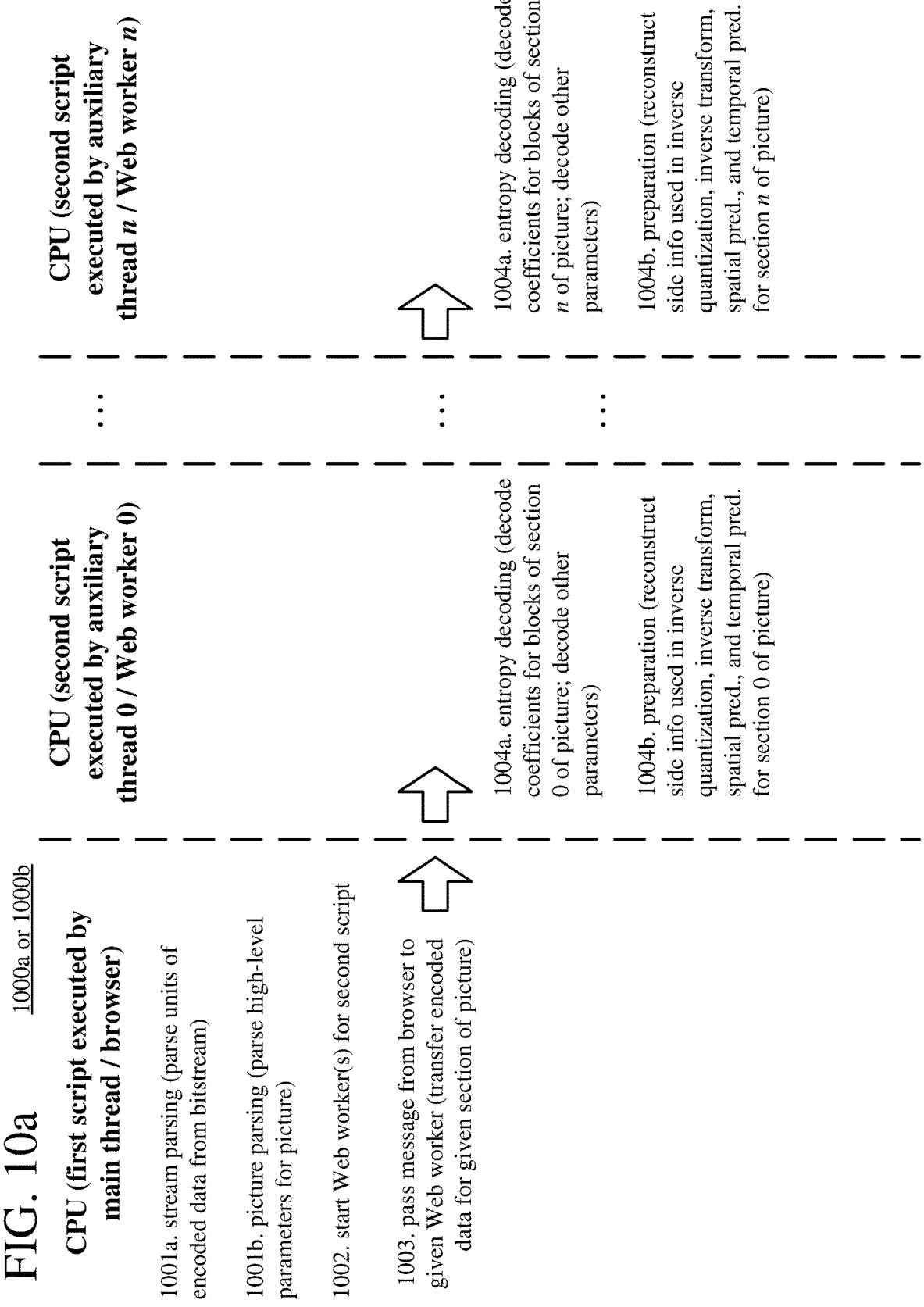

FIG. 10b  1000a or 1000b

*continued from FIG. 10a*

| CPU (first script executed by main thread / browser) | CPU (second script executed by auxiliary thread 0 / Web worker 0) | CPU (second script executed by auxiliary thread n / Web worker n) |
|---|---|---|
| | 1005a. inverse quantization and inverse transform for section 0 (reconstruct residuals from decoded coefficients) | 1005a. inverse quantization and inverse transform for section n (reconstruct residuals from decoded coefficients) |
| | ⋮ | ⋮ |
| | 1005b. spatial prediction and temporal prediction for section 0 (reconstruct intra-picture predictions and inter-picture predictions; combine predictions and residuals) | 1005b. spatial prediction and temporal prediction for section n (reconstruct intra-picture predictions and inter-picture predictions; combine predictions and residuals) |
| | ⋮ | ⋮ |
| | 1006. in-loop filtering for section 0, if filtering across section boundaries is not allowed (deblock filtering) | 1006. in-loop filtering for section n, if filtering across section boundaries is not allowed (deblock filtering) |
| | ⋮ | ⋮ |
| | 1007. pass message from Web worker 0 to browser (reconstructed content for section 0) | 1007. pass message from Web worker n to browser (reconstructed content for section n) |

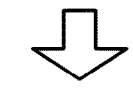
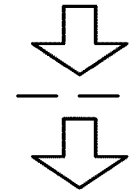

1008. aggregate reconstructed content for sections into picture

FIG. 10c  1000a continued from FIG. 10b

CPU (first script executed by main thread / browser)

1011a. in-loop filtering for picture, if filtering across section boundaries is allowed (deblock filtering)

1012a. post processing for picture (chroma upsampling, color space conversion)

CPU (second script executed by auxiliary thread 0 / Web worker 0)

⋮

CPU (second script executed by auxiliary thread n / Web worker n)

FIG. 10d  1000b continued from FIG. 10b

CPU (first script executed by main thread / browser)

1010. transfer to GPU (transfer reconstructed picture; transfer shader routines)

GPU (shader routines)

1011b. in-loop filtering for picture, if filtering across section boundaries is allowed (deblock filtering)

1012b. post processing for picture (chroma upsampling, color space conversion)

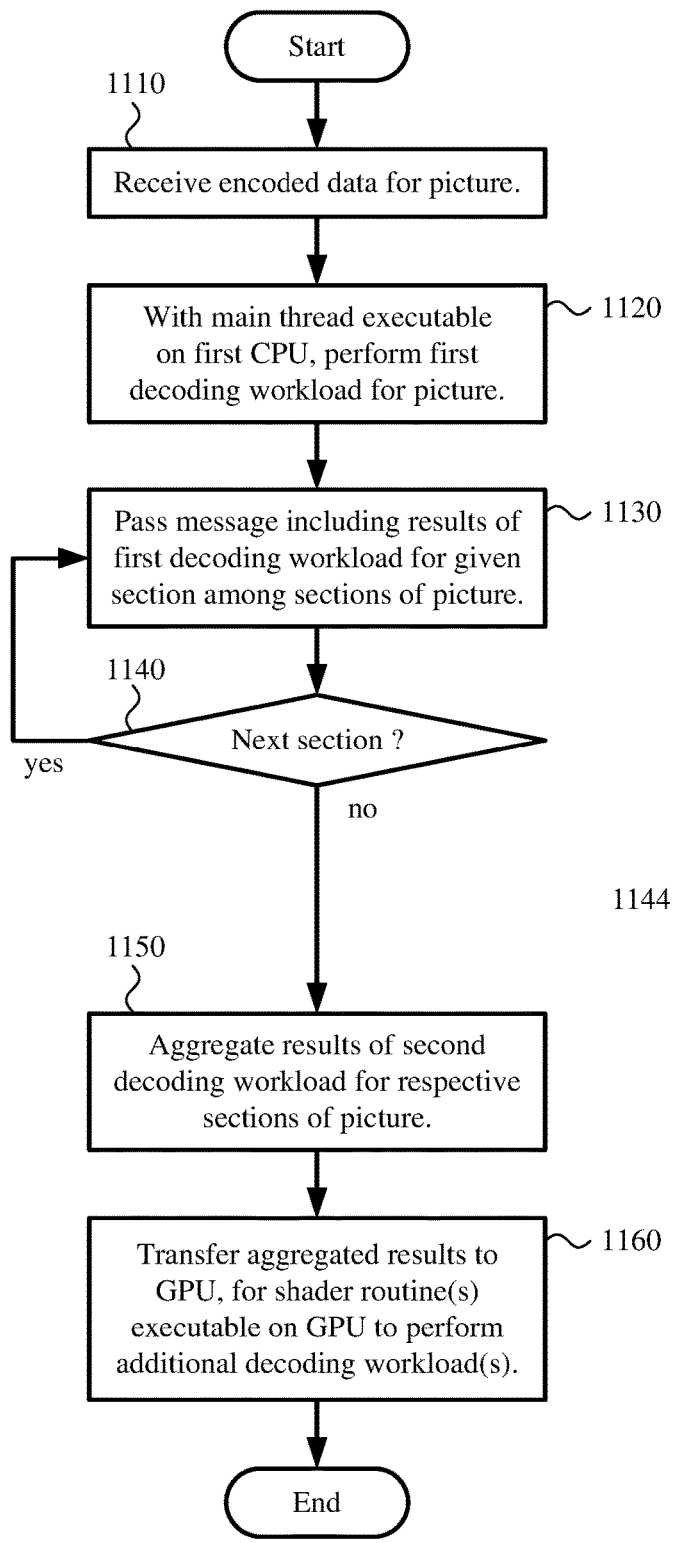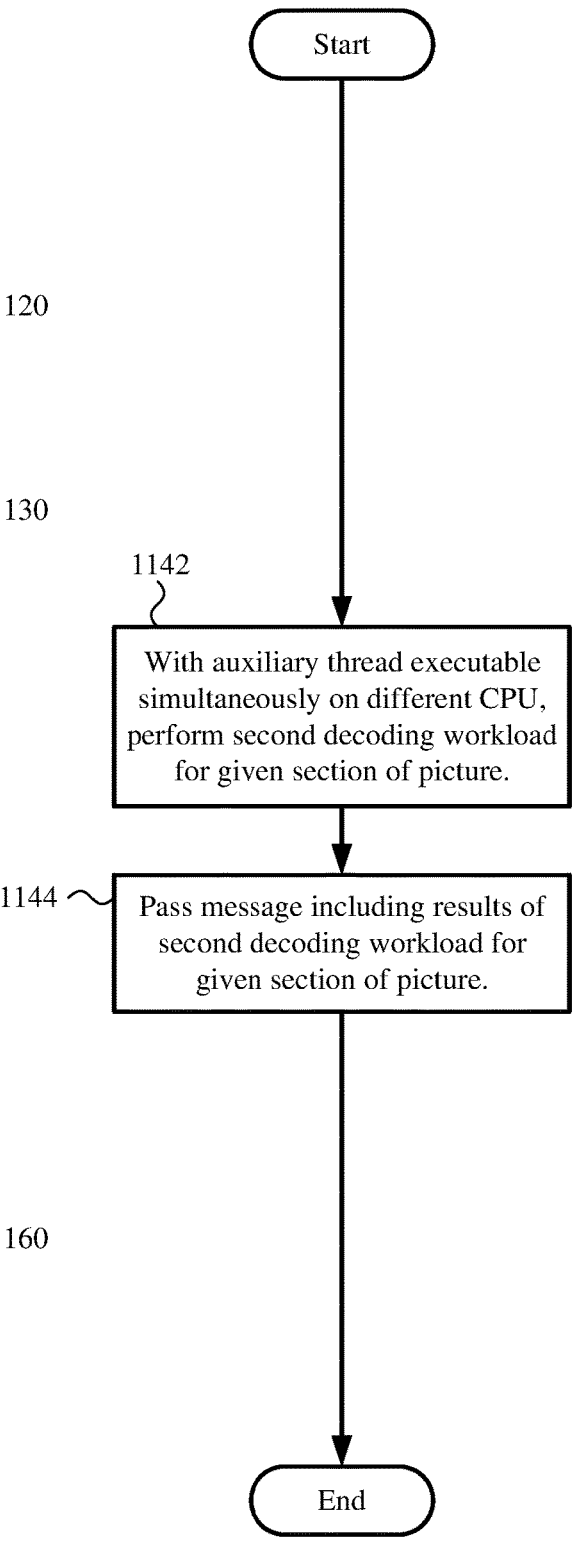

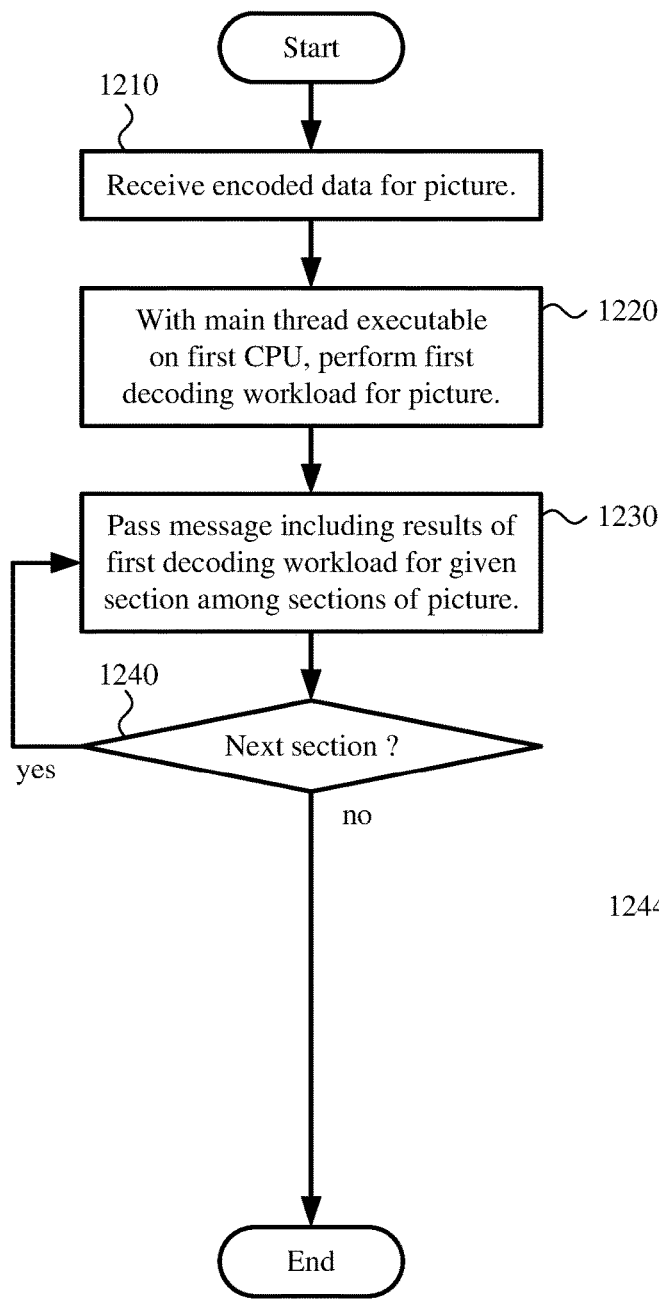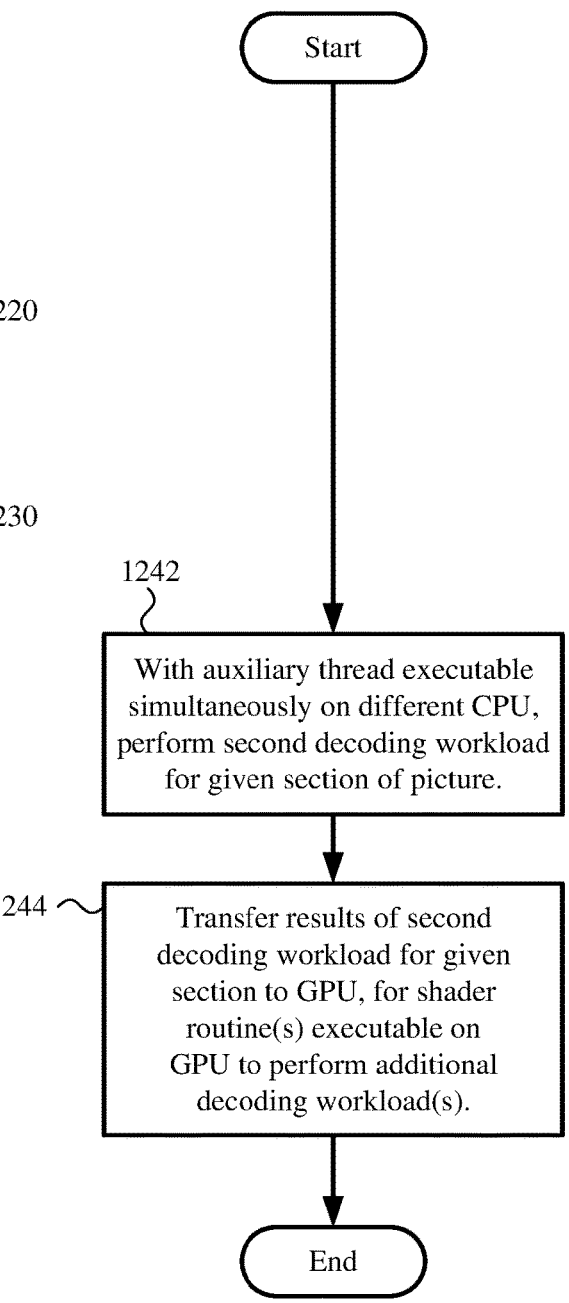

BROWSER-BASED VIDEO DECODER USING MULTIPLE CPU THREADS

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

Digital video can consume an extremely high amount of bits. The number of bits that is used per second of represented video content is known as the bit rate. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, H.264 (MPEG-4 AVC or ISO/IEC 14496-10), and H.265 (ISO/IEC 23008-2) standards, the MPEG-1 (ISO/IEC 11172-2) and MPEG-4 Visual (ISO/IEC 14496-2) standards, and the SMPTE 421M (VC-1) standard. A video codec standard typically defines options for the syntax of an encoded video bitstream, detailing parameters in the bitstream when particular features are used in encoding and decoding. In many cases, a video codec standard also provides details about the decoding operations a video decoder should perform to achieve conforming results in decoding. Aside from codec standards, various proprietary codec formats such as VP8 and VP9 define options for the syntax of an encoded video bitstream and corresponding decoding operations.

Conventionally, a video playback tool includes a video decoder as well as functionality to render reconstructed video pictures for display. Video decoding and rendering operations can be computationally intensive. In particular, while some video decoding operations are relatively simple, others are computationally complex. For example, inverse frequency transforms, fractional sample interpolation operations for motion compensation, in-loop deblock filtering, color conversion, and video re-sizing can require extensive computation. This computational complexity can be problematic in various scenarios, such as decoding of high-quality, high-bit-rate video (e.g., compressed high-definition video) or decoding of low-latency video (e.g., for remote desktop conferencing or real-time communication).

Thus, some video playback tools use hardware acceleration to offload certain computationally intensive operations to a graphics processor or other special-purpose hardware. For example, in some configurations, a computer system includes a primary central processing unit ("CPU") (or multiple primary CPUs) as well as a graphics processing unit ("GPU") or other hardware specially adapted for graphics processing or video decoding. A video playback tool uses the primary CPU as a host to control overall decoding and uses the GPU (or special-purpose decoding hardware) to perform operations that collectively require extensive computation, accomplishing video acceleration. In a typical software architecture for hardware-accelerated video decoding, a host controls overall decoding and may perform some operations using the CPU(s). Across an acceleration interface, the decoder signals data to a device driver for an accelerator (e.g., with a GPU), which performs decoding operations.

SUMMARY

In summary, the detailed description presents innovations in video playback using a video playback tool in a Web browser environment to manage the video playback. The browser-based video playback tool can include routines in a scripting language or other browser-executable programming language, which can be executed in a Web browser environment on diverse computing platforms. For example, a browser-based video decoder performs operations with multiple threads that may execute simultaneously on different central processing units ("CPUs"). The browser-based video decoder can perform decoding operations in parallel for different sections of a picture. In many scenarios, the browser-based video decoder can reconstruct high-quality, high-bit-rate video with low latency (e.g., for remote desktop conferencing or real-time communication).

According to innovations described herein, a computer system includes multiple CPUs and implements a video playback tool using threads executable on the CPUs. The multiple CPUs can be different processing cores of a single multi-core CPU component or multiple multi-core CPU components. Or, the multiple CPUs can be different single-core CPU components. In some implementations, the computer system also includes a graphics processing unit ("GPU"), which the video playback tool can use to perform operations. In other implementations, the video playback tool does not use any GPU to perform operations.

According to one aspect of the innovations described herein, a video playback tool includes a buffer and a browser-based video decoder. The buffer is configured to store at least part of a bitstream of encoded data for one or more pictures of a video sequence. The browser-based video decoder is configured to perform operations to decode the encoded data and reconstruct the picture(s) of the video sequence. The operations include, with a main thread that is executable on a first CPU of the multiple CPUs, performing a first decoding workload for a given picture. The given picture includes multiple sections (e.g., slices, tiles, or other segments of blocks). The operations of the browser-based video decoder also include, with each of one or more auxiliary threads, performing a second decoding workload for a different section among the multiple sections of the given picture. Each auxiliary thread is executable simultaneously on a different CPU of the multiple CPUs. That is, the main thread and auxiliary thread(s) can be executed simultaneously on different CPUs among the multiple CPUs of the computer system. The operations of the browser-based video decoder can also include, with one or more shader routines executable on a GPU, performing one or more additional decoding workloads.

According to another aspect of the innovations described herein, one or more computer-readable media store computer-executable instructions for causing a computer system, when programmed thereby, to perform operations with a browser-based video decoder. The computer-executable instructions include first program code in a scripting language or other browser-executable programming language, as well as second program code in a scripting language or other browser-executable programming language. The first program code, which is executable with a main thread on a first CPU of multiple CPUs of the computer system, specifies a first decoding workload for a given picture of the one or more pictures. The second program code, which is simultaneously executable with one or more auxiliary threads on one or more different CPUs, respectively, of the multiple CPUs of the computer system, specifies a second decoding workload for a given section among multiple sections of the given picture. The main thread can execute the first program code as part of foreground processing, and each of the auxiliary thread(s) can execute the second program code as part of background processing. The computer-executable instructions can also include one or more shader routines, executable on a GPU, that specify one or more additional decoding workloads.

Decoding stages can be split between the decoding workloads in various ways. For example, the first decoding workload includes bitstream parsing for the given picture, the second decoding workload includes, for one of the sections of the given picture, entropy decoding, preparation for inverse quantization, preparation for inverse frequency transforms, preparation for spatial prediction, and preparation for motion compensation, and the additional decoding workload(s) include inverse quantization, inverse frequency transforms, spatial prediction, and motion compensation, and post-processing for the given picture. Alternatively, the second decoding workload (rather than the additional decoding workload(s)) includes inverse quantization, inverse frequency transforms, spatial prediction, and motion compensation for one of the sections of the given picture, and the additional decoding workload(s) include only post-processing for the given picture.

In some example implementations, the main thread is associated with a browser, and the auxiliary threads are associated with auxiliary processes, respectively. The first program code and second program code can be first and second scripts, respectively. For example, each of the auxiliary processes is a Web worker that includes the second script and a Web page that hosts the second script. The browser can initiate the auxiliary processes, e.g., by starting Web workers. The video playback tool can use messages to pass data between the browser and auxiliary processes. For example, results of the first decoding workload are passed, as messages, from the browser to the auxiliary processes. In turn, results of the second decoding workload are passed, as messages, from the auxiliary processes, respectively, to the browser. The results of the second decoding workload can then be aggregated and transferred to a GPU, which performs additional decoding workload(s) on the transferred results. Alternatively, results of the second decoding workload can be directly transferred from the auxiliary processes, respectively, to a GPU, which performs additional decoding workload(s) on the transferred results.

The innovations can be implemented as part of a method, as part of a computer system configured to perform operations for the method, or as part of one or more computer-readable media storing computer-executable instructions for causing a computer system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 1 is a diagram illustrating an example computing system in which some described embodiments can be implemented.

FIG. 2 is a diagram illustrating an example architecture for hardware-accelerated decoding of video bitstreams, in which some described embodiments can be implemented.

FIG. 4 is a diagram illustrating an example decoder system, and FIG. 5 is a diagram illustrating an example video decoder, in conjunction with which some described embodiments can be implemented.

FIG. 6 is a diagram illustrating an example of GPU-accelerated video decoding with a browser-based video decoder that uses a single CPU thread.

FIGS. 7a and 7b are diagrams illustrating a first example of GPU-accelerated video decoding with a browser-based video decoder that uses multiple CPU threads.

FIG. 8 is a diagram illustrating a simplified example of parallel operations performed during GPU-accelerated video decoding with a browser-based video decoder that uses multiple CPU threads.

FIGS. 9a and 9b are diagrams illustrating a second example of GPU-accelerated video decoding with a browser-based video decoder that uses multiple CPU threads.

FIGS. 10a-10d are diagrams illustrating alternative examples of video decoding with a browser-based video decoder that uses multiple CPU threads.

FIGS. 11a and 11b are flowcharts illustrating a first technique for GPU-accelerated video decoding with a browser-based video decoder that uses multiple CPU threads.

FIGS. 12a and 12b are flowcharts illustrating a second technique for GPU-accelerated video decoding with a browser-based video decoder that uses multiple CPU threads.

DETAILED DESCRIPTION

Figure 3A:
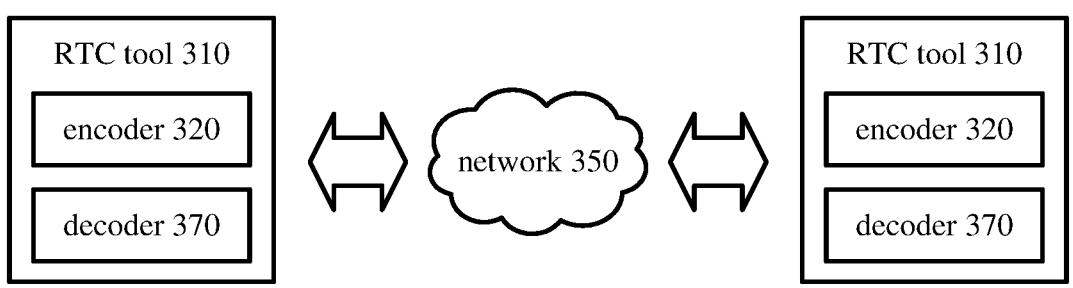
FIGS. 3a and 3b are diagrams illustrating example network environments in which some described embodiments can be implemented.

In some implementations of video playback, a video playback tool in a Web browser environment manages the video playback. The browser-based video playback tool can include routines in a scripting language or other browser-executable programming language. Such routines can be executed in a Web browser environment on diverse computing platforms. Browser-based video playback tools can be overwhelmed by the computational complexity of video decoding and rendering operations, however, especially in time-sensitive scenarios such as remote desktop presentation and real-time communication.

The detailed description presents innovations in video playback using a browser-based video decoder. For example, a browser-based video decoder performs operations with multiple threads that may execute simultaneously on different central processing units ("CPUs"). The browser-based video decoder can perform decoding operations in parallel for different sections of a picture. In many scenarios, the browser-based video decoder can reconstruct high-quality, high-bit-rate video with low latency (e.g., for remote desktop conferencing or real-time communication).

Some of the innovations described herein are illustrated with reference to terms specific to the H.264 standard or H.265 standard, or extensions or variations thereof. The innovations described herein can also be implemented for other video codec standards or formats (e.g., the VP8 format or VP9 format), or extensions or variations thereof.

According to some of the innovations described herein, certain operations of decoding and/or rendering are offloaded to a GPU. The GPU supports one or more interfaces through which shader routines can be specified. For example, the interfaces are WebGL, DirectX, or OpenGL interfaces. WebGL is a JavaScript application programming interface ("API") for rendering graphics within a compatible Web browser, without the use of plug-ins. Using WebGL, a browser can incorporate GPU-accelerated processing and effects as part of rendering a Web page. OpenGL is a cross-language, cross-platform API for rendering graphics, which may be used to interact with a GPU and thereby achieve hardware-accelerated rendering. DirectX is a collection of APIs for handling tasks related to multimedia processing on platforms from Microsoft Corporation. DirectX can be used to interact with a GPU to achieve hardware-accelerated rendering. Alternatively, the GPU exposes another interface.

In many examples described herein, a video playback tool performs at least some decoding and/or rendering operations in a browser environment running on a CPU, and offloads other decoding and/or rendering operations to a GPU. In some example implementations, the decoding and/or rendering operations performed in the browser environment can be performed without using any plugins or client-side decoding software outside the browser. For example, the decoding and/or rendering operations performed in the browser environment are part of a "clientless" gateway, which does not require any plugins or client-side decoding software outside the browser in order to support remote desktop presentation or virtual network computing functionality. Software routines (program code) for the decoding and/or rendering operations performed in the browser environment and software routines (shader routines) for the decoding and/or rendering operations offloaded to the GPU can be downloaded to the browser environment from a server, then executed locally.

Using innovations described herein, a video playback tool can reconstruct screen capture content with very low decoding latency. Performance improvements are especially noticeable for non-camera video content. Such video is common for remote desktop presentation scenarios. More generally, the innovations described herein can be used when decoding other types of video (e.g., "natural" video captured with a camera), especially when latency reduction is a goal (e.g., real-time communication scenarios).

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems.

I. Example Computer Systems.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes processing units (110, 115) and memory (120, 125). The processing units (110, 115) execute computer-executable instructions. A processing unit can be a general-purpose CPU, processor in an application-specific integrated circuit ("ASIC") or any other type of processor. In a multi-processing system, multiple processing units execute computer-executable instructions to increase processing power. For example, FIG. 1 shows CPUs (110) as well as a GPU (115). The CPUs (110) can be different processing cores of a single multi-core CPU component or multiple multi-core CPU components. Or, the CPUs (110) can be different single-core CPU components. The term "CPU thread" (or "thread" executable on a CPU), as used herein, encompasses a hardware thread bound or otherwise associated with a particular processing core or a generic software thread.

In general, the GPU (115) is any specialized circuit, different from the CPUs (110), that accelerates creation and/or manipulation of image data in a graphics pipeline. Typically, the GPU (115) has a highly parallel structure adapted for processing blocks of visual data in parallel, which tends to make the GPU (115) more effective than the general-purpose CPUs (110) for certain operations in 3D computer graphics, 2D computer graphics, and other image processing. The GPU (115) can be implemented as part of a dedicated graphics card (video card), as part of a motherboard, as part of a system on a chip ("SoC"), or in some other way (even on the same die as one of the CPUs (110)). In some example implementations, in addition to supporting operations for texture mapping, rendering of polygons, and geometric calculations (such as rotation and translation of vertices between coordinate systems), the GPU (115) includes support for programmable shader routines. In general, a shader routine is any set of instructions executable by the GPU (115), which may be executed to manipulate vertices and textures with a wide range of operations. Many of the computations of the GPU (115) involve matrix and vector operations. In some example implementations, the GPU (115) provides specialized support for video decoding and playback operations, in addition to providing buffers for reconstructed video pictures.

The tangible memory (120, 125) may be volatile memory (e.g., registers, cache, RAM), non-volatile memory (e.g., ROM, EEPROM, flash memory, etc.), or some combination of the two, accessible by the processing unit(s). In FIG. 1, the memory (120) is CPU memory, accessible to the CPUs (110), and the memory (125) is GPU memory, accessible to the GPU (115). Depending on architecture (e.g., whether the GPU (115) is part of a video card, motherboard, or SoC), the CPU memory can be completely separate from the GPU memory, or the CPU memory and GPU memory can, at least in part, be shared memory or drawn from the same source (e.g., RAM). The memory (120, 125) stores software (180) implementing one or more innovations for browser-based video decoding using multiple CPU threads, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system ("OS") software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) can store instructions for the software (180) implementing one or more innovations for browser-based video decoding using multiple CPU threads.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a display, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine" and "receive" to describe computer operations in a computer system. These terms are high-level abstractions for operations performed by a computer, and should not be confused with acts performed by a human being. The actual computer operations corresponding to these terms vary depending on implementation.

II. Architecture for Hardware-Accelerated, Browser-Based Video Decoding.

FIG. 2 shows a simplified architecture (200) for hardware-accelerated decoding using a browser-based video playback tool. The architecture includes a host (210), which is or is part of a browser that operates in a browser environment, one or more Web workers (212), an accelerator interface (220), a driver (230) for an accelerator, and accelerator hardware (240) for the accelerator. The driver (230) and accelerator hardware (240) collectively provide functionality for the accelerator. The accelerator hardware (240) can be, for example, one or more GPUs or special-purpose decoding hardware. In many of the examples described herein, the accelerator hardware (240) includes one or more GPUs.

The host (210), operating in a browser environment, receives at least part of a bitstream (201) of encoded data for video and manages at least some video decoding operations and/or rendering operations of the accelerator. For example, the host (210) controls overall decoding and can also perform some operations using a CPU, e.g., bitstream parsing, selectively enabling/disabling certain decoding operations (such as deblock filtering), managing buffering and updates of reference frames, and managing output of frames for display. Typically, the host (210) is implemented as user-mode software. For example, the host (210) operates in a browser environment running on a CPU for a Web browser such as Microsoft Internet Explorer, Microsoft Edge, Google Chrome, Mozilla Firefox, Apple Safari, etc.). In some example implementations, the host (210) executes program code (e.g., a script) to control overall decoding with a main CPU thread.

The host (210) uses one or more auxiliary threads to perform video decoding operations, e.g., entropy decoding operations and operations to prepare for subsequent inverse quantization, inverse frequency transform, spatial prediction, and/or motion-compensated prediction. The one or more auxiliary threads are executable on different CPUs from each other and from the host (210), which allows the browser-based video playback tool to utilize available CPUs effectively. In particular, the host (210) can use different auxiliary CPU threads to perform video decoding operations concurrently for different sections of a picture. For example, as shown in FIG. 2, the host (210) spawns Web workers (212) to perform video decoding operations with auxiliary CPU threads. The host (210) can launch Web workers (212) to enable, at a high level, multi-threaded decoding using multiple CPU threads. In general, a Web worker (212) is a script executed from a Web page as part of background processing, independently of other scripts that may be executed by the host (210). The World Wide Web Consortium ("W3C") and Web Hypertext Application Technology Working Group ("WHATWG") define examples of Web workers (212). The host (210) and Web workers (212) can execute simultaneously on different CPUs, which can reduce overall delay and improve responsiveness.

In some example implementations, the host (210) and Web workers (212) communicate and exchange data through a message-passing mechanism. For example, to transfer data to a Web worker (212), the host (210) sends a message to the Web worker (212) using a "postmessage" method exposed by the Web worker (212). Specifically, the host (210) serializes data in a buffer then invokes the postmessage method of the Web worker (212), passing a reference to the buffer as a parameter of the message or passing the serialized data by value as a parameter of the message. This triggers the Web worker (212) to receive and process the message from the host (210). Conversely, the host (210) can retrieve information from a Web worker (212) using an event handler. The Web worker (212) serializes data in a buffer, then posts a message to the host (210). This triggers the event handler for the host (210) to receive and process the message from the Web worker (212), which passes a reference to the buffer as a parameter of the message or passes the serialized data by value as a parameter of the message. In this way, the host (210) and Web workers (212) can exchange data even when resources (e.g., memory) are not shared between them. Data can be transferred by passing a value for the data in a message or, if ownership of a buffer can change between the host (210) and a Web worker (212), by passing a reference to the buffer that stores the data. The message-passing mechanism can be a standardized mechanism defined for the Web workers (212), in which case the host (210) and Web workers (212) use an implementation-specific approach to serializing data for the messages. Alternatively, the host (210) and Web workers (212) exchange data in some other way.

The data that is exchanged between the host (210) and Web workers (212) depends on the stage of decoding. For example, the host (210) transfers encoded data for a section of a picture to a Web worker (212), which performs decoding operations for that section of the picture. The Web worker (212) performs entropy decoding operations as well as operations to prepare for subsequent inverse quantization, inverse frequency transforms, spatial prediction, and motion-compensated prediction for the section. The Web worker (212) transfers entropy-decoded transform coefficients, motion data, mode data, and other intermediate data for the section of the picture to the host (210). Alternatively, the Web worker (212) can also perform inverse quantization, inverse frequency transform, spatial prediction, and motion-compensated prediction operations for the section. In this case, the Web worker (212) transfers reconstructed content for the section to the host (210). The host (210) can then aggregate the data it receives from Web workers (212) for different sections, and transfer the aggregated data to the accelerator hardware (240) through the acceleration interface (220).

The host (210) signals control data and other data for a picture to the driver (230) for the accelerator hardware (240) across an acceleration interface (220). To the host (210), the acceleration interface (220) provides a consistent interface to an accelerator, regardless of the provider of the accelerator. Conversely, to an accelerator, the acceleration interface (220) provides a consistent interface to a host, regardless of the provider of the host. In general, the acceleration interface (220) transfers data for video and instructions for decoding between the host (210) and the accelerator. The details of the acceleration interface (220) depend on implementation. For example, the acceleration interface (220) is exposed to the host (210) as an application programming interface ("API"). The acceleration interface (220) can be a WebGL API (operating in conjunction with a Web browser such as Microsoft Internet Explorer, Microsoft Edge, Google Chrome, Mozilla Firefox, Apple Safari, etc.), OpenGL API, DirectX, or other API(s).

In an example interaction, the host (210) fills a buffer with instructions and/or data then calls a method of the interface (220) to alert the driver (230). The buffer is part of CPU memory (memory that is accessible by a CPU). The buffered instructions and/or data are typically passed to the driver (230) by reference, and as appropriate transferred to memory of the accelerator hardware (240), e.g., to GPU memory (memory that is accessible by a GPU). While a particular implementation of the accelerator interface (220) and driver (230) may be tailored to a particular OS or platform, in general, the accelerator interface (220) and/or driver (230) can be implemented for multiple different OSs or platforms. The host (210) follows specified conventions when putting instructions and data in buffers in CPU memory. The driver (230) retrieves the buffered instructions and data according to the specified conventions and (with the accelerator hardware (240)) performs decoding and/or rendering operations.

The accelerator, through the driver (230) and accelerator hardware (240), receives data for video and performs video decoding operations and/or rendering operations using the data, as managed by the host (210). The division of decoding operations between the host (210) (and Web workers (212)) and the accelerator depends on implementation, as detailed below.

Although FIG. 2 shows the host (210) managing interactions with the accelerator, alternatively, the Web workers (212) can directly transfer data to the accelerator. In this case, a Web worker (212) signals control data and other data for a picture to the driver (230) for the accelerator hardware (240) across the acceleration interface (220). The transfer by a Web worker (212) can use the same mechanism as a transfer by the host (210), as described above.

III. Example Network Environments.

Figure 3B:
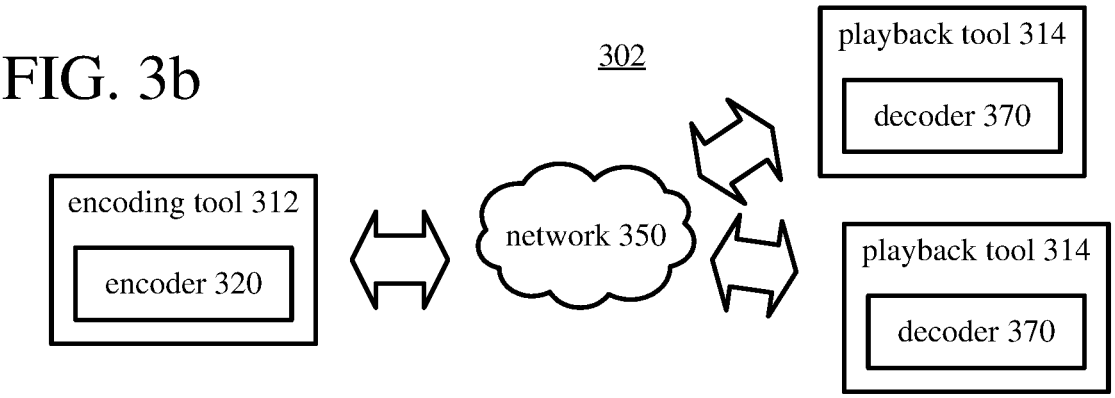

FIGS. 3a and 3b show example network environments (301, 302) that include video encoders (320) and video decoders (370). The encoders (320) and decoders (370) are connected over a network (350) using an appropriate communication protocol. The network (350) can include the Internet or another computer network.

In the network environment (301) shown in FIG. 3a, each real-time communication ("RTC") tool (310) includes both an encoder (320) and a decoder (370) for bidirectional communication. Although FIG. 3a shows a single RTC tool per node, the encoder (320) is part of a video capture tool, and the decoder (370) is part of a video playback tool. A given encoder (320) can produce output compliant with the H.265/HEVC standard, SMPTE 421M standard, ISO/IEC 14496-10 standard (also known as H.264/AVC), another standard, or a proprietary format such as VP8 or VP9, or a variation or extension thereof, with a corresponding decoder (370) accepting encoded data from the encoder (320). The bidirectional communication can be part of a video conference, video telephone call, or other two-party or multi-party communication scenario. Although the network environment (301) in FIG. 2a includes two RTC tools (310), the network environment (301) can instead include three or more RTC tools (310) that participate in multi-party communication.

An RTC tool (310) manages encoding by an encoder (320) and also manages decoding by a decoder (370). FIG. 4 shows an example decoder system (400) that can be included in the RTC tool (310). Alternatively, the RTC tool (310) uses another decoder system.

In the network environment (302) shown in FIG. 3b, an encoding tool (312) includes an encoder (320) that encodes video for delivery to multiple playback tools (314), which include decoders (370). The unidirectional communication can be provided for a video surveillance system, Web camera monitoring system, remote desktop conferencing presentation or sharing, wireless screen casting, cloud computing or gaming, or other scenario in which video is encoded and sent from one location to one or more other locations. Although the network environment (302) in FIG. 3b includes two playback tools (314), the network environment (302) can include more or fewer playback tools (314). In general, a playback tool (314) communicates with the encoding tool (312) to determine a stream of video for the playback tool (314) to receive. The playback tool (314) receives the stream, buffers the received encoded data for an appropriate period, and begins decoding and playback.

The encoding tool (312) can include server-side controller logic for managing connections with one or more playback tools (314). A playback tool (314) can include client-side controller logic for managing connections with the encoding tool (312). A video playback tool (314) often requests encoded video from a server over a network. For this reason, a video playback tool (314) may be referred to as a "client." FIG. 4 shows an example decoder system (400) that can be included in the playback tool (314). Alternatively, the playback tool (314) uses another decoder system.

IV. Example Decoder Systems.

FIG. 4 is a block diagram of an example video decoder system (400) in conjunction with which some described embodiments may be implemented. The video decoder system (400) includes a browser-based video decoder (450), which is further detailed in FIG. 5. As part of the decoding, the video decoder system (400) can use acceleration hardware (e.g., one or more GPUs) to perform various decoding operations and/or rendering operations.

The video decoder system (400) can be a general-purpose decoding tool capable of operating in any of multiple decoding modes such as a low-latency decoding mode for real-time communication, a transcoding mode, and a higher-latency decoding mode for media playback from a file or stream, or it can be a special-purpose decoding tool adapted for one such decoding mode. The video decoder system (400) can be adapted for decoding of a particular type of content (e.g., screen capture video) or adapted for decoding of various types of content. The video decoder system (400) can be implemented as part of an OS module, as part of an application library, as part of a standalone application, as software executing in a browser environment, and/or using special-purpose hardware (e.g., a GPU). Overall, the video decoder system (400) receives coded data from a channel (410) and produces reconstructed pictures as output for an output destination (490).

The reconstructed pictures can be produced at a frame rate of, for example, 30 frames per second. As used herein, the term "picture" generally refers to source, coded or reconstructed image data. For progressive-scan video, a picture is a progressive-scan video frame. For interlaced video, a picture can be an interlaced video frame or video field. For interlaced video, an interlaced video frame might be de-interlaced prior to encoding. Alternatively, two complementary interlaced video fields are encoded together as a single video frame or separately encoded as two fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

In general, a pixel is the set of one or more collocated sample values for a location in a picture, which may be arranged in different ways for different chroma sampling formats. Typically, before encoding, the sample values of video are converted to a color space such as YUV, in which sample values of a luma (Y) component represent brightness or intensity values, and sample values of chroma (U, V) components represent color-difference values. The precise definitions of the color-difference values (and conversion operations between YUV color space and another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. Chroma sample values may be sub-sampled to a lower chroma sampling rate (e.g., for a YUV 4:2:0 format) in order to reduce the spatial resolution of chroma sample values, or the chroma sample values may have the same resolution as the luma sample values (e.g., for a YUV 4:4:4 format).

During different stages of decoding and rendering, sample values of a picture may be represented in memory in a planar format or in a packed format. In a planar format, sample values are stored in memory using separate arrays for different color components. For example, a first array stores sample values of the luma (Y) component, logically organized by location within a picture, a second array stores sample values of the first chroma (U) component, logically organized by location within the picture, and a third array stores sample values of the second chroma (V) component, logically organized by location within the picture. Chroma sample values can be downsampled horizontally and/or vertically. Alternatively, some other type of texture values (e.g., transform coefficients, residual values) can be stored in a planar format. In a packed format, sample values for a given pixel are collocated in memory. For example, an array stores sample values of the luma (Y) component interleaved with sample values of the chroma (U, V) components. Chroma sample values have the same spatial resolution as luma sample values. Alternatively, a packed format can include sample values in another color space (such as RGB or GBR) after color space conversions, and can potentially include one or more additional values per pixel (e.g., an opacity value per pixel).

With reference to FIG. 4, the decoder system (400) includes a channel (410), which can represent storage, a communications connection, or another channel for coded data as input. The channel (410) produces coded data that has been channel coded. The channel (410) may also include elements (not shown) for, e.g., FEC decoding and analog signal demodulation. A channel decoder (420) can process the coded data. For example, the channel decoder (420) de-packetizes and/or demultiplexes data that has been organized for transmission or storage as a media stream (e.g., according to a media program stream or transport stream format such as ITU-T H.222.01 ISO/IEC 13818-1 or an Internet real-time transport protocol format such as IETF RFC 3550), in which case the channel decoder (420) can parse syntax elements added as part of the syntax of the media transmission stream. Or, the channel decoder (420) separates coded video data that has been organized for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s).

The coded data (421) that is output from the channel decoder (420) is stored in a temporary coded data buffer (430) until a sufficient quantity of such data has been received. The coded data (421) includes coded pictures (431) and reference picture management information (432). The coded data (421) in the coded data buffer (430) contain, as part of the syntax of an elementary coded video bitstream, coded data for one or more pictures. The coded data (421) in the coded data buffer (430) can also include media metadata relating to the encoded video data (e.g., as one or more parameters in one or more supplemental enhancement information messages or video usability information messages).

In general, the coded data buffer (430) temporarily stores coded data (421) until such coded data (421) is used by the browser-based video decoder (450). At that point, coded data for a coded picture (431) and reference picture management information (432) are transferred from the coded data buffer (430) to the video decoder (450). As decoding continues, new coded data is added to the coded data buffer (430) and the oldest coded data remaining in the coded data buffer (430) is transferred to the video decoder (450).

The browser-based video decoder (450) decodes a coded picture (431) to produce a corresponding decoded picture (451). As shown in FIG. 5, the video decoder (450) receives the coded picture (431) as input as part of a coded video bitstream (505). The video decoder (450) produces the corresponding decoded picture (451) as output as reconstructed video (595). FIG. 5 shows decoding operations and flows of information between decoding modules at a high level. As explained with reference to FIG. 2 and further explained in the next section, depending on implementation, decoding operations can be performed in the browser-based video decoder (450) with a main thread executing on a CPU, auxiliary thread executing on a CPU (e.g., for a Web worker), or accelerator (e.g., GPU).

The syntax of the coded video bitstream (elementary bitstream) is typically defined in a codec standard or format, or extension or variation thereof. The encoded data in the elementary bitstream includes syntax elements organized as syntax structures. In general, a syntax element can be any element of data, and a syntax structure is zero or more syntax elements in a video elementary bitstream in a specified order.

Generally, the video decoder (450) includes multiple decoding modules that perform decoding tasks such as entropy decoding, inverse quantization, inverse frequency transforms, motion compensation, intra-picture prediction, and filtering. Many of the components of the decoder (450) are used for both intra-picture decoding (that is, decoding of intra-coded blocks) and inter-picture decoding (that is, decoding of inter-coded blocks). The exact operations performed by those components can vary depending on the type of information being decompressed. The format of the coded video bitstream (505) can be a Windows Media Video format, VC-1 format, MPEG-x format (e.g., MPEG-1, MPEG-2, or MPEG-4), H.26x format (e.g., H.261, H.262, H.263, H.264, H.265), or VPx format, or a variation or extension thereof, or some other format.

A picture can be organized into multiple tiles of the same size or different sizes. For example, a picture is split along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. For example, in some video coding/decoding scenarios, a slice is a set of contiguous units (e.g., macroblocks) in scanline order. A slice can be decoded independently of other slices in a picture, which improves error resilience. That is, decoding for a slice does not depend on the results of decoding another slice in the same picture. A video encoder decides how to partition a picture into slices (e.g., how many slices to uses, the locations of the slices). For example, a picture can have 4 slices, 6 slices, 10 slices, or some other number of slices.

The content of a slice or tile can be further organized as blocks or other sets of sample values. Blocks may be further sub-divided at different stages. For example, a picture can be divided into 64×64 blocks, 32×32 blocks or 16×16 blocks, which can in turn be divided into smaller blocks of sample values.

For syntax according to the H.264/AVC standard, a picture can be partitioned into one or more slices of the same size or different sizes. A picture (or slice) is split into 16×16 macroblocks. A macroblock ("MB") includes luma sample values organized as four 8×8 luma blocks and corresponding chroma sample values organized as 8×8 chroma blocks. Generally, a MB has a prediction mode such as inter or intra. A MB includes one or more prediction units (e.g., 16×16 blocks, 16×8 blocks, 8×16 blocks, 8×8 blocks, 8×4 blocks, 4×8 blocks, or 4×4 blocks, which may be called partitions for inter-picture prediction) for purposes of signaling of prediction information (such as prediction mode details, motion vector ("MV") information, etc.) and/or prediction processing. A MB also has one or more residual data units for purposes of coding/decoding of residual values.

For syntax according to the H.265/HEVC standard, a picture (or slice or tile) is split into coding tree units. A slice includes an independent slice segment, with a full slice header, and may include one or more dependent slice segments, with truncated slice headers. A coding tree unit ("CTU") includes luma sample values organized as a luma coding tree block ("CTB") and corresponding chroma sample values organized as two chroma CTBs. The size of a CTU (and its CTBs) is selected by the video encoder. A luma CTB can contain, for example, 64×64, 32×32, or 16×16 luma sample values. A CTU includes one or more coding units. A coding unit ("CU") has a luma coding block ("CB") and two corresponding chroma CBs. For example, according to quadtree syntax, a CTU with a 64×64 luma CTB and two 64×64 chroma CTBs (a YUV 4:4:4 format) can be split into four CUs, with each CU including a 32×32 luma CB and two 32×32 chroma CBs, and with each CU possibly being split further into smaller CUs according to quadtree syntax. Or, as another example, according to quadtree syntax, a CTU with a 64×64 luma CTB and two 32×32 chroma CTBs (a YUV 4:2:0 format) can be split into four CUs, with each CU including a 32×32 luma CB and two 16×16 chroma CBs, and with each CU possibly being split further into smaller CUs according to quadtree syntax.

In H.265/HEVC implementations, a CU has a prediction mode such as inter or intra. A CU typically includes one or more prediction units for purposes of signaling of prediction information (such as prediction mode details, displacement values, etc.) and/or prediction processing. A prediction unit ("PU") has a luma prediction block ("PB") and two chroma PBs. A CU also typically has one or more transform units for purposes of coding/decoding of residual values, where a transform unit ("TU") has a luma transform block ("TB") and two chroma TBs. A CU may contain a single TU (equal in size to the CU) or multiple TUs. According to quadtree syntax, a TU can be split into four smaller TUs, which may in turn be split into smaller TUs. A video encoder decides how to partition video into CTUs (CTBs), CUs (CBs), PUs (PBs) and TUs (TBs).

As used herein, the term "block" can indicate a partition, residual data unit, CTB, CB, PB, TB, or some other set of values, depending on context. The term "unit" can indicate a MB, CTU, CU, PU, TU or some other set of blocks, or it can indicate a single block, depending on context, or it can indicate a chunk of encoded data. The term "partition" can indicate a PU or other unit, or PB or other block.

With reference to FIG. 5, a buffer receives encoded data in the coded video bitstream (505) and makes the received encoded data available to the parser/entropy decoder (510). The parser/entropy decoder (510) entropy decodes entropy-coded data, typically applying the inverse of entropy coding performed in the encoder (e.g., context-adaptive binary arithmetic decoding with binarization). Thus, the parser/entropy decoder (510) decompresses quantized transform coefficient values as well as certain side information (e.g., MV information, QP values, mode decisions, parameter choices, filter parameters). Typical entropy decoding techniques include Exponential-Golomb decoding, Golomb-Rice decoding, context-adaptive binary arithmetic decoding, differential decoding, Huffman decoding, run length decoding, variable-length-to-variable-length decoding, variable-length-to-fixed-length decoding, Lempel-Ziv decoding, dictionary decoding, and combinations of the above. The entropy decoder can use different decoding techniques for different kinds of information, can apply multiple techniques in combination, and can choose from among multiple code tables within a particular decoding technique. In FIG. 5, as a result of parsing and entropy decoding, the parser/entropy decoder (510) produces general control data (522), quantized transform coefficient data (532), intra prediction data (542), motion data (552), and filter control data (562).

The general decoding control (520) receives the general control data (522). For example, the general control data (522) includes information indicating which reference pictures to retain in the decoded picture buffer ("DPB") (570). The general decoding control (520) provides control signals (not shown) to other modules (such as the scaler/inverse transformer (535), intra-picture predictor (545), motion compensator (555), and intra/inter switch) to set and change decoding parameters during decoding.

With reference to FIG. 4, as appropriate, when performing its decoding process, the video decoder (450) may use one or more previously decoded pictures (469) as reference pictures for inter-picture prediction. The video decoder (450) reads such previously decoded pictures (469) from a decoded picture temporary memory storage area (460), which is, for example, the DPB (570).

With reference to FIG. 5, if the picture being decoded (given picture) is predicted using inter-picture prediction, a motion compensator (555) receives the motion data (552), such as MV data, reference picture selection data and merge mode index values. The given picture can be entirely or partially coded using inter-picture prediction. An "inter-coded block" is a block coded using inter-picture prediction. The motion compensator (555) applies MVs to the reconstructed reference picture(s) from the DPB (570). For a given block at a location in the given picture, an MV indicates an offset from that location in a reference picture to a block of predicted sample values. The motion compensator (555) produces predicted sample values (that is, motion-compensated prediction values) for inter-coded blocks of the given picture.

In a separate path within the video decoder (450), the intra-picture predictor (545) receives the intra prediction data (542), such as information indicating the prediction mode/direction used. A given picture can be entirely or partially coded using intra-picture prediction. An "intra-coded block" is a block coded using intra-picture prediction. For intra spatial prediction, using values of a reconstruction (538) of the given picture, according to the prediction mode/direction, the intra-picture predictor (545) spatially predicts sample values of a current block of the given picture from neighboring, previously reconstructed sample values of the given picture. In some implementations, intra-picture prediction is not allowed across slice boundaries—intra-picture prediction is only permitted within a slice. Or, for intra block copy mode, the intra-picture predictor (545) predicts the sample values of a current block using previously reconstructed sample values of a reference block in the same picture, where the reference block is indicated by an offset (block vector) for the current block.

The intra/inter switch selects values of a motion-compensated prediction or intra-picture prediction for use as the prediction (558) for a given block. For example, when H.265/HEVC syntax is followed, the intra/inter switch can be controlled based on a syntax element encoded for a CU of a picture that can contain intra-coded CUs and/or inter-coded CUs. When H.264/AVC syntax is followed, the intra/inter switch can be controlled based on a syntax element encoded for a MB of a picture. When residual values have been encoded/signaled, the video decoder (450) combines the prediction (558) with reconstructed residual values to produce the reconstruction (538) of the content from the video signal. When residual values have not been encoded/signaled, the video decoder (550) uses the values of the prediction (558) as the reconstruction (538).

The video decoder (450) also reconstructs residual values. To reconstruct residual values, when they have been encoded/signaled, the scaler/inverse transformer (535) receives and processes the quantized transform coefficient data (532). In the scaler/inverse transformer (535), a scaler/inverse quantizer performs inverse scaling and inverse quantization on the quantized transform coefficients. The scaler/inverse transformer (535) sets values for QP for a picture, tile, slice and/or other portion of video based on syntax elements in the bitstream. An inverse frequency transformer performs an inverse frequency transform, producing blocks of residual values or sample values. For example, the inverse frequency transformer applies an inverse block transform to frequency transform coefficients, producing sample values or residual values. The inverse frequency transform can be an inverse DCT, an integer approximation thereof, or another type of inverse frequency transform (e.g., an inverse discrete sine transform or an integer approximation thereof), and can have a variable block size. If the frequency transform was skipped during encoding, the inverse frequency transform is also skipped. In this case, the scaler/inverse quantizer can perform inverse scaling and inverse quantization on blocks of residual values (or sample values), producing reconstructed residual values (or sample values). The video decoder (450) combines reconstructed residual values with values of the prediction (558), producing sample values of the reconstruction (538).

For intra-picture prediction, the values of the reconstruction (538) can be fed back to the intra-picture predictor (545). For inter-picture prediction, the values of the reconstruction (538) can be further filtered. In the merger/filter(s) (565), the video decoder (450) merges content from different tiles into a reconstructed version of the picture. The video decoder (450) selectively performs deblock filtering and SAO filtering according to the filter control data (562) and rules for filter adaptation, so as to adaptively smooth discontinuities across boundaries in the pictures. Other filtering (such as de-ringing filtering or ALF; not shown) can alternatively or additionally be applied. Slice or tile boundaries can be selectively filtered or not filtered at all, depending on settings of the video decoder (450) or a syntax element within the encoded bitstream data. The DPB (570) buffers the reconstructed current picture for use as a reference picture in subsequent motion-compensated prediction.

With reference to FIG. 4, the decoded picture temporary memory storage area (460) includes multiple picture buffer storage areas (461, 462, . . . , 46n). The decoder (450) uses the reference picture management information (432) to identify a picture buffer (461, 462, etc.) in which it can store a decoded picture (451). The decoder (450) stores the decoded picture (451) in that picture buffer. In a manner consistent with the reference picture management information (432), the decoder (450) also determines whether to remove any reference pictures from the multiple picture buffer storage areas (461, 462, . . . , 46n).

The video decoder system (400) can also include a post-processing filter (not shown). The post-processing filter can include deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter is applied to reconstructed sample values outside of the motion compensation loop, before output for display.

Post-processing can also include upsampling of chroma sample values and/or color space conversion. As part of post-processing, when chroma sample values have been downsampled for encoding, the chroma sample values can be replicated or filtered to upsample the chroma sample values to the original chroma sample resolution, such that chroma resolution matches luma resolution. As part of post-processing, sample values can be converted from a YUV format to another format such as RGB or GBR. The sample values in the destination color format (e.g., RGB, GBR) can also include opacity values (sometimes called alpha values and designated with the letter a, as in RGBa).

An output sequencer (480) identifies when the next picture to be produced in display order (also called output order) is available in the decoded picture storage area (460). When the next picture (481) to be produced in display order is available in the decoded picture storage area (460), it is read by the output sequencer (480) and output to the output destination (490) (e.g., display). In general, the order in which pictures are output from the decoded picture storage area (460) by the output sequencer (480) (display order) may differ from the order in which the pictures are decoded by the decoder (450) (bitstream order).

Depending on implementation and the type of decompression desired, modules of the video decoder system (400) and/or video decoder (450) can be added, omitted, split into multiple modules, combined with other modules, and/or replaced with like modules. In alternative embodiments, decoder systems or decoders with different modules and/or other configurations of modules perform one or more of the described techniques. Specific embodiments of decoder systems typically use a variation or supplemented version of the video decoder system (400). Specific embodiments of video decoders typically use a variation or supplemented version of the video decoder (450). The relationships shown between modules within the video decoder system (400) and video decoder (450) indicate general flows of information in the video decoder system (400) and video decoder (450), respectively; other relationships are not shown for the sake of simplicity. In general, a given module of the video decoder system (400) or video decoder (450) can be implemented by software executable on a CPU, by software controlling special-purpose hardware (e.g., graphics hardware for video acceleration), and/or by special-purpose hardware (e.g., in an ASIC). The next section describes ways in which different operations of the video decoder system (400) and browser-based video decoder (450) can be split between CPU threads (that is, software executable on CPUs) and, when present, an accelerator such as a GPU.

V. Innovations in Browser-Based Video Decoding.

This section describes innovations in video playback using a browser-based video decoder. For example, a browser-based video decoder performs operations with multiple threads that may execute simultaneously on different CPUs. The browser-based video decoder can perform decoding operations in parallel for different sections of a picture. The different sections of the picture can be slices, tiles, or other sections of the picture for which decoding operations can be performed independently and in parallel. In many scenarios, the browser-based video decoder can reconstruct high-quality, high-bit-rate video with low latency (e.g., for remote desktop conferencing or real-time communication).

In many of the examples described in this section, a browser-based video decoder offloads at least some decoding operations to a GPU. Alternatively, a browser-based video decoder can offload decoding operations to an accelerator that is implemented in some other way (e.g., special-purpose video decoding hardware). Or, a browser-based video decoder can perform video decoding and rendering without any assistance from a GPU or other accelerator.

In many of the examples described in this section, a browser-based video decoder executes scripts to perform decoding operations. The scripts are examples of program code in a scripting language or other browser-executable programming language. Alternatively, the browser-based video decoder uses some other type of program code in a scripting language or other browser-executable programming language.

A. Example of Browser-Based Video Decoding with a Single CPU Thread.

For the sake of comparison, FIG. 6 shows an example (600) of GPU-accelerated video decoding with a browser-based video decoder that uses a single CPU thread. In the example (600) of FIG. 6, the browser-based video decoder uses a single CPU thread (main thread) to execute a script to control overall decoding and perform certain decoding operations. For example, the script is JavaScript code or code in another scripting language. The browser-based video decoder offloads other decoding operations to a GPU.

With the script executed by the main thread, the video decoder performs stream parsing operations (601a) to parse units of encoded data from the bitstream. For example, the video decoder determines boundaries in the bitstream for network abstraction layer ("NAL") units for slices of a current picture. With the script executed by the main thread, the video decoder also performs picture parsing operations (601b) to parse high-level parameters for the picture. For example, the video decoder parses parameters of a sequence parameter set ("SPS") and/or parameters of a picture parameter set ("PPS") that apply when decoding the current picture. With the script executed by the main thread, the video decoder performs (602a) entropy decoding operations to decode transform coefficients for units of the sections of the picture and decode various parameters. Then, still with the script executed by the main thread, the video decoder prepares (602b) for subsequent operations, reconstructing side information used in inverse quantization (e.g., QP values), inverse frequency transforms, spatial prediction (e.g., intra prediction modes), and temporal prediction (e.g., MV data, reference picture indices) for blocks of the picture.

The video decoder transfers (603) the entropy-decoded transform coefficients and side information for the picture from CPU memory to GPU memory. In GPU memory, the transform coefficients and side information are accessible to the GPU. Through calls across an acceleration interface (e.g., WebGL calls), the video decoder orchestrates decoding and rendering operations by the GPU. The video decoder transfers shader routines to the GPU, for execution to perform the decoding and rendering operations in parallel for different blocks of the picture.

With shader routine(s) executing on the GPU, the video decoder performs (604a) inverse quantization and inverse transform operations on the entropy-decoded transform coefficients, reconstructing residual values for blocks of the picture. With the shader routine(s), the video decoder also performs (604b) spatial prediction for intra-coded blocks of the picture and temporal prediction for inter-coded blocks of the picture, reconstructing intra-picture prediction values and motion-compensated prediction values, and combines the prediction values and residual values. Then, with the shader routine(s) executing on the GPU, the video decoder performs (605) in-loop filtering for the picture, e.g., deblock filtering, and performs (606) post-processing for the picture, e.g., chroma upsampling operations, color space conversion operations.

In the example (600) shown in FIG. 6, the browser-based video decoder uses a single CPU thread (main thread). The video decoder fails to utilize other CPUs even when those CPUs are available for decoding operations. As a result, operations performed by the single CPU thread (main thread) can be a bottleneck in the overall decoding process.

B. Examples of Browser-Based Video Decoding with Multiple CPU Threads.

By using multiple CPU threads, a browser-based video decoder can distribute the processing load for decoding operations among available CPUs. In particular, while the browser-based video decoder continues to use one CPU thread (main thread) for some high-level operations, the video decoder delegates some other decoding operations to one or more auxiliary threads. For example, the browser-based video decoder uses the main thread to execute a first script to control overall decoding, and the video decoder uses the auxiliary threads to execute a second script to perform various decoding operations for different sections of a picture (e.g., different slices or tiles of the picture). The scripts can be JavaScript code or code in another scripting language.

The browser-based video decoder can offload still other decoding operations to a GPU or other accelerator. In many decoding scenarios, the browser-based video decoder harnesses the processing power of multiple CPUs and the accelerator to parallelize various decoding operations, which enables reconstruction of high-quality video (e.g., with a high frame rate and/or high spatial resolution) at low decoding latency.

1. Examples with Main CPU Thread Directing GPU Operations.

FIGS. 7a and 7b show an example (700) of GPU-accelerated video decoding with a browser-based video decoder that uses multiple CPU threads. As shown in FIG. 7a, with a first script executed by a main CPU thread for a browser, the video decoder performs stream parsing operations (701a) to parse units of encoded data from the bitstream. For example, the video decoder determines boundaries in the bitstream for NAL units for slices of a current picture, which includes multiple slices. With the script executed by the main CPU thread, the video decoder also performs picture parsing operations (701b) to parse high-level parameters for the picture. For example, the video decoder parses parameters of a SPS and/or parameters of a PPS that apply when decoding the current picture.

The video decoder starts (702) one or more Web workers to execute the second script. FIGS. 7a and 7b show n Web workers, which are numbered from 0 to n. Because different sections of a picture are independently decodable, the n Web workers can each execute the second script in parallel. The current picture can include n sections, more than n sections (in which case a Web worker can start decoding another section after it finishes decoding one section of the picture), or less than n sections (in which case a Web worker may be idle).

For each of the Web workers, the video decoder passes (703) a message from the main CPU thread (browser) to the Web worker. With the message, the video decoder transfers encoded data for a given section of the current picture. For example, the video decoder passes a NAL unit with encoded data for slice 0 to Web worker 0, passes a NAL unit with encoded data for slice 1 to Web worker 1, and so on, up to slice n and Web worker n.

In some example implementations, a picture includes n slices and the video decoder starts n Web workers. Each of the n Web workers is assigned one slice identifier. A Web worker decodes video content for the slice that has its assigned slice identifier. Even if the video decoder provides encoded data (NAL units) for all slices to all Web workers, a Web worker retains only the encoded data (NAL unit) for its assigned slice, and discards the rest.

For each of the n Web workers, with the second script executed by an auxiliary CPU thread, the video decoder performs (704a) entropy decoding operations to decode transform coefficients for blocks of the assigned section of the picture and to decode various parameters for the assigned section of the picture. With the second script executed by the auxiliary CPU thread, the video decoder also prepares (704b) for subsequent operations, reconstructing side information used in inverse quantization (e.g., QP values), inverse frequency transforms (e.g., transform sizes), spatial prediction (e.g., intra prediction modes for intra-coded blocks), and temporal prediction (e.g., MV data, reference picture indices for inter-coded blocks) for blocks of the associated section. In particular, the preparation operations can include prediction and reconstruction of MV data and intra prediction modes. In this way, the Web worker determines side information that will be used by the GPU for later decoding operations.

In the example (700) shown in FIGS. 7a and 7b, only the main thread interacts with the GPU across an acceleration interface (e.g., with WebGL calls), and the Web workers cannot directly interact with the GPU across the acceleration interface. Therefore, for each of the n Web workers, when the Web worker completes execution of the second script for its section, the video decoder passes (705) a message to the main CPU thread (browser) from the Web worker. With the message, the video decoder transfers decoded, quantized transform coefficients, reconstructed MV data, reconstructed mode data, and other side information for a given section of the current picture. For example, the video decoder passes transform coefficients and side information for slice 0 from Web worker 0 to the main CPU thread, passes transform coefficients and side information for slice 1 from Web worker 1 to the main CPU thread, and so on, up to slice n and Web worker n.

With the main CPU thread, the browser-based video decoder aggregates (706) the entropy-decoded quantized transform coefficients, reconstructed MV data, reconstructed mode data, and other side information received from the n Web workers, respectively. In this way, the video decoder collects the output of the Web workers for individual sections of the picture, and organizes the transform coefficients and side information for blocks of the picture for transfer from CPU memory to GPU memory.

Then, the video decoder transfers (707) the transform coefficients and side information for the entire picture from CPU memory to GPU memory. In GPU memory, the transform coefficients and side information are accessible to the GPU. Through calls across an acceleration interface (e.g., WebGL calls), the video decoder orchestrates decoding and rendering operations by the GPU for different blocks of the picture in parallel. The video decoder also transfers shader routines to the GPU, which specify the decoding and rendering operations offloaded to the GPU.

With the shader routine(s) executing on the GPU, the video decoder performs (708a) inverse quantization and inverse transform operations on the entropy-decoded transform coefficients, reconstructing residual values for blocks of the picture. With the shader routine(s), the video decoder performs (708b) spatial prediction for intra-coded blocks of the picture and temporal prediction for inter-coded blocks of the picture, reconstructing intra-picture prediction values and motion-compensated prediction values, and combines the prediction values and residual values. Then, with the shader routine(s) executing on the GPU, the video decoder performs (709) in-loop filtering for the picture, e.g., deblock filtering, and performs (710) post-processing for the picture, e.g., chroma upsampling operations, color space conversion operations.

2. Examples of Overlapped Operations for Multiple Pictures.

FIG. 8 shows a simplified example (800) of parallel operations performed during GPU-accelerated video decoding with a browser-based video decoder that uses multiple CPU threads, as described with reference to FIGS. 7a and 7b. With a main thread associated with a browser, a CPU executes a first script to perform stream parsing operations for a picture. With an auxiliary thread associated with a Web worker, another CPU executes a second script to perform entropy decoding operations and various preparation operations for a slice of a picture. The video decoder can start multiple Web workers and use multiple auxiliary threads to perform operations for different slices of a picture. With one or more shader routines, a GPU performs other operations offloaded to the GPU.

FIG. 8 shows operations divided into periods. The periods generally indicate dependencies between operations, but do not indicate absolute timing requirements. Different periods can have different durations, depending, e.g., on the complexity of operations.

In period 0, with the main CPU thread, the video decoder performs stream parsing operations for picture 0. The video decoder also transfers (not shown) encoded data for slices of picture 0 to Web workers.

In period 1, with auxiliary CPU threads 0 . . . n, the video decoder performs entropy decoding operations and various preparation operations for slices 0 . . . n, respectively, of picture 0. When a Web worker finishes, the video decoder transfers (not shown) transform coefficients and side information for a slice of picture 0 from the Web worker back to the browser. Simultaneously, with the main CPU thread, the video decoder performs stream parsing operations for picture 1, and transfers (not shown) encoded data for slices of picture 1 to the Web workers.

In period 2, with the main CPU thread, the video decoder aggregates (not shown) the transform coefficients and side information for the slices of picture 0, and transfers (not shown) the aggregated data to the GPU. With one or more shader routines executing on the GPU, the video decoder performs GPU decoding operations for picture 0. Simultaneously, with auxiliary CPU threads 0 n, the video decoder performs entropy decoding operations and various preparation operations for slices 0 . . . n, respectively, of picture 1. When a Web worker finishes, the video decoder transfers (not shown) transform coefficients and side information for a slice of picture 1 from the Web worker back to the browser. With the main CPU thread, performs stream parsing operations for picture 2, and transfers (not shown) encoded data for slices of picture 2 to the Web workers.

In this way, operations for different decoding workloads can be overlapped in the browser-based video decoder. Multiple CPUs can be used simultaneously to perform operations for different sections of a picture, and multiple CPUs and a GPU can be used simultaneously to perform operations for different pictures. By effectively utilizing available processing resources, the browser-based video decoder can reconstruct high quality video with low decoding latency in many scenarios.

3. Examples with Web Workers Directing GPU Operations.

For some implementations of Web browsers, a Web worker can directly interact with a GPU across an acceleration interface to offload decoding operations to the GPU. FIGS. 9a and 9b show an example (900) of GPU-accelerated video decoding with a browser-based video decoder that uses multiple CPU threads, in which Web workers interact with a GPU across an acceleration interface (e.g., with WebGL calls).

For the first four stages (901a, 901b, 902, 903, 904a, and 904b), the example (900) of FIGS. 9a and 9b is the same as the example (700) of FIGS. 7a and 7b. That is, with a first script executed by a main CPU thread for a browser, the video decoder performs stream parsing operations (901a) to parse units of encoded data from the bitstream and performs picture parsing operations (901b) to parse high-level parameters for a picture. The video decoder starts (902) n Web workers to execute a second script and, for each of the n Web workers, passes (903) a message from the main CPU thread (browser) to the Web worker, transferring encoded data for one section of the picture. Then, for each of the n Web workers, with a second script executed by an auxiliary CPU thread, the video decoder performs (904a) entropy decoding operations and prepares (904b) for subsequent operations to be performed with the GPU.

For each of the n Web workers, when the Web worker completes execution of the second script for its section, the video decoder transfers (905) decoded transform coefficients and side information for that section of the picture from CPU memory to GPU memory. Through calls across an acceleration interface (e.g., WebGL calls), the video decoder orchestrates decoding and rendering operations by the GPU for different blocks of the section in parallel. The video decoder also transfers shader routines to the GPU, which specify the decoding and rendering operations that are offloaded to the GPU. Thus, for a given one of the Web workers, the video decoder transfers decoded, quantized transform coefficients, reconstructed MV data, reconstructed mode data, and other side information for a given section of the picture to GPU memory. For example, the video decoder passes transform coefficients and side information for slice 0 from Web worker 0 to the GPU, passes transform coefficients and side information for slice 1 from Web worker 1 to the GPU, and so on, up to slice n and Web worker n.

With the shader routine(s) executing on the GPU, the video decoder performs (906*a*) inverse quantization and inverse transform operations on the entropy-decoded transform coefficients, reconstructing residual values for blocks of a section of the picture. With the shader routine(s), the video decoder performs (906*b*) spatial prediction for intra-coded blocks and temporal prediction for inter-coded blocks of the section of the picture, reconstructing intra-picture prediction values and motion-compensated prediction values, and combines the prediction values and residual values. With the shader routine(s) executing on the GPU, the video decoder reconstructs content of the respective sections of the picture. The reconstructed sections are composited into reconstructed picture. With shader routine(s) executing on the GPU (which can be transferred (907) by the browser), the video decoder then performs (908) in-loop filtering for the reconstructed picture, e.g., deblock filtering, and performs (909) post-processing for the reconstructed picture, e.g., chroma upsampling operations, color space conversion operations.

Alternatively, after sections of a picture have been reconstructed in the GPU, the reconstructed content of the respective sections is transferred to the main CPU thread. The main CPU thread composites the sections into a picture and, by itself, or by calling across an acceleration interface (e.g., WebGL calls) and providing shader scripts, performs in-loop filtering and post-processing operations for the picture.

4. Examples with Web Workers Performing More Operations.

In other examples of browser-based video decoding with multiple CPU threads, an accelerator (e.g., GPU) has a lesser role or no role at all. FIGS. 10*a*-10*d* show alternative examples (1000, 1001) of video decoding with a browser-based video decoder that uses multiple CPU threads.

For the first four stages (1001*a*, 1001*b*, 1002, 1003, 1004*a*, and 1004*b*), the examples (1000*a*, 1000*b*) of FIGS. 10*a*-10*d* are the same as the example (700) of FIGS. 7*a* and 7*b* and example (900) of FIGS. 9*a* and 9*b*. After reconstructing quantized transform coefficients and side information, however, the Web workers perform additional decoding operations.

For each of the n Web workers, with the second script executed by an auxiliary CPU thread, the video decoder performs (1005*a*) inverse quantization and inverse transform operations on the entropy-decoded transform coefficients, reconstructing residual values for blocks of a section of the picture. With the second script executed by an auxiliary CPU thread, the video decoder also performs (1005*b*) spatial prediction for intra-coded blocks and temporal prediction for inter-coded blocks of the section of the picture, reconstructing intra-picture prediction values and motion-compensated prediction values, and combines the prediction values and residual values. Thus, for each of the sections of the picture, the video decoder reconstructs content of that section. If filtering across section boundaries is not allowed, for each of the n Web workers, with the second script executed by an auxiliary CPU thread, the video decoder performs (1006) in-loop filtering for the reconstructed picture, e.g., deblock filtering. (If filtering across section boundaries is allowed, the in-loop filtering is deferred.)

For each of the n Web workers, when the Web worker completes execution of the second script for its section, the video decoder passes (1007) a message to the main CPU thread (browser) from the Web worker. With the message, the video decoder transfers reconstructed content for a given section of the picture. For example, the video decoder passes reconstructed content for slice 0 from Web worker 0 to the main CPU thread, passes reconstructed content for slice 1 from Web worker 1 to the main CPU thread, and so on, up to slice n and Web worker n. With the main thread executing on a CPU, the browser-based video decoder aggregates (1008) the reconstructed content received from the n Web workers, respectively. With the main thread, the video decoder composites the sections of the picture for transfer from CPU memory to GPU memory.

Next, as shown in FIG. 10*c*, with the main CPU thread, the video decoder performs (1011*a*) in-loop filtering for the reconstructed picture, e.g., deblock filtering, if filtering across section boundaries is allowed. With the main CPU thread, the video decoder also performs (1012*a*) post-processing for the reconstructed picture, e.g., chroma upsampling operations, color space conversion operations.

Alternatively, as shown in FIG. 10*d*, after compositing reconstructed content for sections into the reconstructed picture, the video decoder transfers (1010) the reconstructed picture from CPU memory to GPU memory. Through calls across an acceleration interface (e.g., WebGL calls), the video decoder orchestrates operations by the GPU for different blocks of the picture in parallel. The video decoder also transfers shader routines to the GPU, which specify the operations offloaded to the GPU. With the shader routine(s) executing on the GPU, the video decoder performs (1011*b*) in-loop filtering for the picture, e.g., deblock filtering, if filtering across section boundaries is allowed. With the shader routine(s) executing on the GPU, the video decoder also performs (1012*b*) post-processing for the picture, e.g., chroma upsampling operations, color space conversion operations.

C. Techniques for Browser-Based Video Decoding with Multiple CPU Threads.

FIGS. 11*a* and 11*b* illustrate a first technique (1100*a*, 1100*b*) for GPU-accelerated video decoding with a browser-based video decoder that uses multiple CPU threads. FIGS. 12*a* and 12*b* illustrate a second technique (1200*a*, 1200*b*) for GPU-accelerated video decoding with a browser-based video decoder that uses multiple CPU threads. A video playback tool as described with reference to FIG. 4, or other video playback tool, can perform the first decoding technique or second decoding technique. The video playback tool includes a browser-based video decoder and runs on a computer system with multiple CPUs and a GPU. The multiple CPUs can be different processing cores of a single multi-core CPU component, different processing cores of multiple multi-core CPU components, different single-core CPU components, or some combination thereof.

FIGS. 11a and 12a show operations (1100a, 1200a) performed with a main thread executing on a CPU of the multiple CPUs of the computer system. For example, the main CPU thread is associated with a browser, and it executes first program code (in a scripting language or other browser-executable programming language) that specifies a first decoding workload. The main CPU thread can execute the first program code as part of foreground processing (e.g., for a browser). Alternatively, the main CPU thread can execute the first program code as part of background processing. More generally, the main CPU thread is associated with a main process, which includes the main CPU thread and data accessible to the main process (but not auxiliary processes). The main process manages initiates auxiliary processes. In some implementations, the main process also manages interactions with a GPU or other accelerator.

The video decoder can use one or more auxiliary threads, each executing simultaneously on a different CPU of the multiple CPUs of the computer system, to perform some operations. FIGS. 11b and 12b show operations (1100b, 1200b) performed with one such auxiliary CPU thread. For example, the auxiliary thread is associated with an auxiliary process, and it executes second program code (in a scripting language or other browser-executable programming language) that specifies a second decoding workload. An auxiliary process includes an auxiliary CPU thread and data accessible to the auxiliary process (but not a main process or other auxiliary processes). The browser can initiate the one or more auxiliary processes. In particular, in some example implementations, the first program code is a first script, the second program code is a second script, and the auxiliary process is a Web worker that includes the second script and a Web page hosting the second script. In an auxiliary process, an auxiliary thread can execute the second program code as part of background processing (e.g., for a Web worker).

For the first technique, to start, with reference to FIG. 11a, the browser-based video decoder receives (1110) encoded data for a picture. The encoded data is part of a bitstream of encoded data for one or more pictures of a video sequence. A buffer of the video playback tool can be configured to store at least part of the bitstream of encoded data for the picture(s) of the video sequence.

The browser-based video decoder is configured to perform various operations to decode the encoded data and reconstruct the picture(s) of the video sequence. In particular, with a main thread that is executable on a first CPU of the multiple CPUs of the computer system, the video decoder performs (1120) a first decoding workload for a given picture of the picture(s) of the video sequence.

The given picture includes multiple sections. In general, the multiple sections of the given picture are independently decodable. For example, the multiple sections are multiple slices, multiple tiles, or multiple segments of blocks in the given picture.

For a given section among the multiple sections of the given picture, the browser-based video decoder passes (1130) a message to an auxiliary thread executable on a different CPU of the multiple CPUs of the computer system. The message includes at least some results of the first decoding workload for the given section. For example, the main CPU thread (for the browser) serializes the results of the first decoding workload (e.g., a NAL unit for a slice), according to a format, as the payload of one or more input messages and passes the serialized results in the input message(s) to an auxiliary CPU thread (for a Web worker or other auxiliary process). The video decoder checks (1140) whether to continue for a next section of the picture. If so, the video decoder passes (1130), to another auxiliary CPU thread, a message including results of the first decoding workload for the next section among the multiple sections of the given picture. In this way, for the different sections of the given picture, respectively, the video decoder provides results of the first decoding workload to auxiliary CPU threads that perform the second decoding workload for those different sections, respectively.

With reference to FIG. 11b, with one of the auxiliary CPU threads, the video decoder performs (1142) a second decoding workload for a given section among multiple sections of the given picture. The auxiliary thread, compared to the main thread and any other auxiliary threads used for decoding, is executable simultaneously on a different CPU of the multiple CPUs of the computer system. After the auxiliary CPU thread has completed the second decoding workload for the given section, the video decoder passes (1144) a message back to the main CPU thread. The message includes at least some results of the second decoding workload for the given section of the given picture. For example, the auxiliary CPU thread (for a Web worker or other auxiliary process) serializes the results of the second decoding workload, according to a format, as the payload of one of more output messages and passes the serialized results in the output message(s) to the main CPU thread (for the browser). Although FIG. 11b shows operations for a single auxiliary CPU thread, the same operations can be performed simultaneously on different CPUs, by each of multiple auxiliary CPU threads for different sections of the given picture.

Returning to FIG. 11a, with the main CPU thread, the video decoder aggregates (1150) the at least some results of the second decoding workload for the respective sections of the picture. The video decoder transfers (1160) the aggregated results to the GPU, for one or more shader routines executable on the GPU to perform one or more additional decoding workloads. Subsequently, with the shader routine(s) executable on the GPU, the video decoder performs the additional decoding workload(s) on the transferred results.

For example, the first decoding workload (performed with the main CPU thread at stage 1120) includes bitstream parsing operations for the given picture. The second decoding workload (performed with each auxiliary CPU thread at stage 1142) includes, for a given section of the given picture, entropy decoding, preparation for inverse quantization, preparation for inverse frequency transforms, preparation for spatial prediction, and preparation for motion compensation. In this case, the results that are aggregated (1150) include entropy-decoded transform coefficients, mode information, motion information, and other side information for the multiple sections, respectively, of the given picture. The additional decoding workload(s) (performed with shader routine(s) on the GPU) include inverse quantization, inverse frequency transforms, spatial prediction, motion compensation, and post-processing for the given picture.

Or, as another example, the first decoding workload (performed with the main CPU thread at stage 1120) includes bitstream parsing operations for the given picture, and the second decoding workload (performed with each auxiliary CPU thread at stage 1142) includes, for a given section of the given picture, entropy decoding, preparation for inverse quantization, preparation for inverse frequency transforms, preparation for spatial prediction, preparation for motion compensation, inverse quantization, inverse frequency transforms, spatial prediction, and motion compensation. In this case, the results that are aggregated (1150) include reconstructed content for the multiple sections, respectively, of the given picture. The additional decoding workload(s) (performed with shader routine(s) on the GPU) include post-processing for the given picture.

For the second technique (1200a, 1200b) shown in FIGS. 12a and 12b, auxiliary CPU threads (for auxiliary processes such as Web workers) directly interact with the GPU. With a main CPU thread, the video decoder performs the same operations as the first technique, stopping after the transfer of results to the auxiliary thread(s) for the respective sections of a picture. That is, as described above with reference to FIG. 11a, the browser-based video decoder receives (1210) encoded data for a given picture and, with the main CPU thread, performs (1220) the first decoding workload for the given picture. Then, as described above with reference to FIG. 11a, for a given section among the multiple sections of the given picture, the video decoder passes (1230) a message to an auxiliary CPU thread, including at least some results of the first decoding workload for the given section, and checks (1240) whether to continue for a next section of the picture. In this way, for the different sections of the given picture, the video decoder provides results of the first decoding workload to auxiliary CPU threads that perform the second decoding workload for those different sections, respectively.

With reference to FIG. 12b, with one of the auxiliary CPU threads, the video decoder performs (1242) a second decoding workload for a given section among the sections of the given picture. After the auxiliary CPU thread has completed the second decoding workload for the given section, the video decoder transfers (1244) at least some of the results of the second decoding workload for the given section to the GPU, for one or more shader routines executable on the GPU to perform one or more additional decoding workloads. Subsequently, with the shader routine(s) executable on the GPU, the video decoder performs the additional decoding workload(s) on the transferred results. Although FIG. 12b shows operations for a single auxiliary CPU thread, the same operations can be performed simultaneously on different CPUs, by each of multiple auxiliary CPU threads for different sections of the given picture.

For example, the first decoding workload (performed with the main CPU thread at stage 1220) includes bitstream parsing operations for the given picture. The second decoding workload (performed with each auxiliary CPU thread at stage 1242) includes, for a given section of the given picture, entropy decoding, preparation for inverse quantization, preparation for inverse frequency transforms, preparation for spatial prediction, and preparation for motion compensation. In this case, the results that are transferred (1244) include entropy-decoded transform coefficients, mode information, motion information, and other side information for the multiple sections, respectively, of the given picture. The additional decoding workload(s) (performed with shader routine(s) on the GPU) include inverse quantization, inverse frequency transforms, spatial prediction, and motion compensation. Post-processing can be performed after reconstructed content for the different sections is composited into a reconstructed picture.

Or, as another example, the first decoding workload (performed with the main CPU thread at stage 1220) includes bitstream parsing operations for the given picture. The second decoding workload (performed with each auxiliary CPU thread at stage 1242) includes, for a given section of the given picture, entropy decoding, preparation for inverse quantization, preparation for inverse frequency transforms, preparation for spatial prediction, preparation for motion compensation, inverse quantization, inverse frequency transforms, spatial prediction, and motion compensation. In this case, the results that are transferred (1244) include reconstructed content for the multiple sections, respectively, of the given picture. After compositing reconstructed content for the different sections into a reconstructed picture, the additional decoding workload(s) (performed with shader routine(s) on the GPU) include post-processing for the given picture.

The video decoder can repeat the technique (1100a, 1100b) shown in FIGS. 11a and 11b or the technique (1200a, 1200b) shown in FIGS. 12a and 12b on a picture-by-picture basis.

Alternatively, if a computer system includes an accelerator that does not include a GPU, a browser-based video decoder that uses multiple CPU threads can still offload decoding and/or rendering operations to the accelerator.

Alternatively, if a computer system includes multiple CPUs but lacks a GPU or other accelerator, a browser-based video decoder can use the multiple CPUs to perform all decoding and rendering operations. For example, a main CPU thread performs a first decoding workload, as described with reference to FIG. 11a or FIG. 12a, and an auxiliary CPU thread performs a second decoding workload. In this case, the second decoding workload can include, for a given section of a given picture, entropy decoding, preparation for inverse quantization, preparation for inverse frequency transforms, preparation for spatial prediction, preparation for motion compensation, inverse quantization, inverse frequency transforms, spatial prediction, and motion compensation. Post-processing can be performed after reconstructed content for the different sections is composited into a reconstructed picture.

D. Examples of Program Code for Browser-Based Video Decoding.

In some remote desktop presentation scenarios, a browser connects to a server in order to provide a remote desktop presentation connection. Decoding and/or rendering operations can be provided through program code (e.g., JavaScript code) executable in a browser environment for any compatible browser (e.g., HTML5-compatible browser), without requiring any plugins or client-side decoding software outside the browser environment. As such, the browser-based code may be executable on a variety of OSs and platforms (e.g., smartphone, tablet, laptop computer), without any platform-specific or OS-specific modifications. For newer codec standards and formats such as the H.264 standard, H.265 standard, VP8, and VP9, however, performing video decoding and rendering operations using such browser-based code can be challenging. In particular, even when Web workers are used to parallelize decoding operations, the CPU(s) available on a platform might not be powerful enough to support low-latency decoding, especially for high-quality video. In some example implementations, a video playback tool uses an accelerator (e.g., GPU) to perform at least some video decoding and rendering operations. In some example implementations, by using specialized graphics primitives and shader routines executable in a GPU to perform block operations in parallel, overall latency is reduced. In particular, this configuration can speed up the process of decoding and rendering blocks, and merging the blocks from memory in a planar YUV format into actual locations in a display buffer in a packed YUV format.

One or more computer-readable media can store computer-executable instructions for causing a computer system, when programmed thereby, to perform operations with a browser-based video decoder. With the operations, the video decoder can decode encoded data for one or more pictures of a video sequence and reconstruct the picture(s) of the video sequence. For example, the computer-executable instructions include first program code and second program code. The program code can be in a scripting language (e.g., JavaScript) or other browser-executable programming language. The first program code, which is executable with a main thread on a first CPU of multiple CPUs of the computer system, specifies a first decoding workload for a given picture of the picture(s) of the video sequence. The second program code, which is simultaneously executable with one or more auxiliary threads on one or more different CPUs, respectively, of the multiple CPUs of the computer system, specifies a second decoding workload for a given section among multiple sections of the given picture. The computer-executable instructions can also include one or more shader routines, executable on a GPU, that specify one or more additional decoding workloads.

E. Examples of Transfers from CPU Memory to GPU Memory.

For decoding and rendering of blocks using CPUs and a GPU, decoding operations are split between the CPUs and the GPU. With a main thread (e.g., for a browser) executing on a CPU, a video decoder receives and parses encoded data in a bitstream. With one or more auxiliary threads (e.g., for Web workers) executing on CPUs, a video decoder performs entropy decoding operations, which yield quantized transform coefficients for residual values. With the auxiliary CPU thread(s), the video decoder also reconstructs side information. For example, the video decoder performs operations to prepare for inverse quantization and inverse frequency transforms, which yield QP values and other parameters. The video decoder also performs operations to prepare for spatial prediction, which yield intra prediction modes, block sizes, etc. For inter-coded blocks, the video decoder performs operations to prepare for temporal prediction, which yield MV data, reference picture indices, sizes and locations of partitions, etc. The transform coefficients and side information are buffered in CPU memory by the main CPU thread (see the example of FIGS. 11a and 11b) or by the auxiliary CPU thread(s) (see the example of FIGS. 12a and 12b).

Before a GPU can perform operations using the quantized transform coefficients and reconstructed side information, the quantized transform coefficients and reconstructed side information are transferred from CPU memory to GPU memory. Or, if the auxiliary CPU thread(s) perform additional decoding operations to reconstruct content, reconstructed sample values can be transferred from CPU memory to GPU memory.

Texture values (transform coefficients or sample values) for blocks of a picture can be serially copied, one block after another, from CPU memory to GPU memory, directly into a buffer. One problem with this approach is that it involves inefficient, serial transfer operations for individual blocks. Another problem is that certain blocks may lack texture values (e.g., skipped blocks). Alternatively, texture values for blocks can be aggregated in CPU memory for transfer to GPU memory. For example, texture values for the aggregated blocks are packed together into contiguous memory locations in CPU memory (and remain in contiguous memory locations after transfer). Texture values for intra-coded blocks and inter-coded blocks can be transferred in different passes, in which case texture values for intra-coded blocks can be aggregated and texture blocks for inter-coded blocks can be aggregated. Texture values for a luma component of a picture can be transferred from CPU memory to GPU memory in the same pass as texture values for chroma components of the picture, or in different passes.

Side information (such as MV data, mode data, etc.) can be packed into contiguous memory locations before transfer (and remain in contiguous memory locations after transfer), so that memory is not used for blocks lacking the side information. Or, a buffer for the side information can include memory locations for side information for each block, and the memory locations are empty for any block lacking the side information.

After transfer, the GPU memory stores the side information and texture values. One or more texture buffers in the GPU memory store the texture values for residual values for blocks. The GPU memory includes one or more other buffers that store one or more previously reconstructed pictures. For example, a reference buffer stores a previously reconstructed picture for use as a reference picture. GPU memory can include multiple reference buffers storing multiple reference pictures. The GPU memory also includes one or more display buffers, which each store a reconstructed version of a picture. For decoding of subsequent pictures, a display buffer may be a reference buffer. The texture buffer(s), reference buffer(s), and display buffer(s) are accessible to shader routines that execute in the GPU.

For additional details about transfers between CPU memory and GPU memory in some example implementations, see U.S. patent application Ser. No. 15/097,143, entitled "Efficient Decoding and Rendering of Blocks in a Graphics Pipeline," filed Apr. 12, 2016, and U.S. patent application Ser. No. 15/192,827, entitled "Efficient Decoding and Rendering of Inter-coded Blocks in a Graphics Pipeline," filed Jun. 24, 2016.

F. Examples of Shader Routines.

One or more shader routines can be executed in a GPU to perform one or more decoding operations on data in GPU memory. The shader routine(s) can also be used to transfer sample values for blocks from GPU memory to a display buffer. The shader routine(s) are highly parallelized, typically operating on multiple blocks in parallel.

Conventionally, a GPU uses a vertex shader routine for rasterization. The vertex shader routine determines a position to which values will be rendered, and it determines how to perform the rendering. A GPU can execute a vertex shader routine to map source locations (in reference buffer(s) and in texture buffer(s)) to destination locations (in a display buffer) for multiple blocks in parallel. For decoding and rendering operations, a vertex shader routine can generate graphics primitive with texture coordinates and other attributes based on side information. The vertex shader routine can generate graphics primitives (and their attributes) for multiple intra-coded blocks in parallel and generate graphics primitives (and their attributes) for multiple inter-coded blocks in parallel.

Conventionally, a GPU uses a fragment shader routine (also called a pixel shader routine) to perform actual rendering operations. In some example implementations, the GPU executes one or more shader routines (e.g., fragment shader routines) to perform decoding operations for multiple blocks in parallel. With a given shader routine, the GPU processes multiple graphics primitives in parallel. The decoding operations can proceed in multiple passes in the graphics pipeline. For example, for multiple blocks in parallel, the GPU can execute shader routine(s) to perform:

in a first rendering pass, inverse quantization operations and inverse transform operations on quantized transform coefficients to reconstruct residual values for the respective blocks;

in a second rendering pass, intra-picture prediction operations to determine predicted values for intra-coded blocks and combination operations to blend the predicted values and residual values for the respective intra-coded blocks;

in a third rendering pass, inter-picture prediction (motion compensation) operations to determine predicted values for inter-coded blocks, potentially including interpolation operations and prediction from multiple reference pictures, and combination operations to blend the predicted values and residual values for the respective inter-coded blocks;

in a fourth rendering pass, deblock filtering operations, dering filtering operations, and/or other filtering operations on reconstructed sample values; and in a fifth rendering pass, chroma upsampling operations (with sample repetition, bilinear filtering, or other upsampling), color space conversion operations (e.g., YUV to RGB conversion), and/or other post-processing operations.

Some rendering passes (e.g., the second rendering pass or third rendering pass) can be split into multiple passes for different sizes of blocks. Other rendering passes (e.g., fourth rendering pass) can be split into multiple passes for different color components.

After the decoding operations, a fragment shader routine can transfer sample values for different blocks in parallel to locations in the display buffer. The fragment shader routine can transfer sample values for blocks in multiple passes. For example, the fragment shader routine loads sample values for luma blocks in parallel in a first pass, and it loads sample values for chroma blocks in parallel in a second pass.

For additional details about shader routines and GPU operations in some example implementations, see U.S. patent application Ser. No. 15/097,143, entitled "Efficient Decoding and Rendering of Blocks in a Graphics Pipeline," filed Apr. 12, 2016, and U.S. patent application Ser. No. 15/192,827, entitled "Efficient Decoding and Rendering of Inter-coded Blocks in a Graphics Pipeline," filed Jun. 24, 2016.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising multiple central processing units ("CPUs"), wherein the computer system implements a video playback tool comprising:
  a buffer configured to store at least part of a bitstream of encoded data for one or more pictures of a video sequence; and
  a browser-based video decoder configured to perform operations to decode the encoded data and reconstruct the one or more pictures of the video sequence, the operations including:
    with a main thread that is executable on a first CPU of the multiple CPUs, performing a first decoding workload for a given picture of the one or more pictures, wherein a first script specifies the first decoding workload, wherein the main thread is associated with a browser configured to execute the first script, the first decoding workload including determining boundaries, in the bitstream, for units of encoded data for multiple independently-decodable spatial sections, respectively, of the given picture, and wherein the multiple independently-decodable spatial sections are multiple slices, multiple tiles, or multiple segments of blocks of the given picture;
    transferring the units of encoded data to auxiliary processes of the browser-based video decoder for parallel decoding of different spatial sections among the multiple independently-decodable spatial sections of the given picture;
    with each of multiple auxiliary threads, performing a second decoding workload for a different spatial section, among the multiple independently-decodable spatial sections, of the given picture using the transferred unit of encoded data for the different spatial section, the auxiliary threads each being executable simultaneously on a different CPU of the multiple CPUs, wherein a second script, different than the first script, specifies the second decoding workload, and wherein the auxiliary threads are associated with the auxiliary processes, respectively, which are configured to execute the second script as Web workers as part of background processing; and
    aggregating results, from the multiple auxiliary threads, of the performing the second decoding workload for at least some of the multiple independently-decodable spatial sections, respectively, of the given picture.

2. The computer system of claim 1, wherein the multiple CPUs are:
  different processing cores of a single multi-core CPU component;
  different processing cores of multiple multi-core CPU components; or
  different single-core CPU components.

3. The computer system of claim 1, wherein:
  the first decoding workload includes bitstream parsing for the given picture, the bitstream parsing including the determining the boundaries, in the bitstream, for the units of encoded data; and
  the second decoding workload includes, for one of the multiple independently-decodable spatial sections of the given picture, entropy decoding, preparation for inverse quantization, preparation for inverse frequency transforms, preparation for spatial prediction, preparation for motion compensation, inverse quantization, inverse frequency transforms, spatial prediction, and motion compensation.

4. The computer system of claim 1, wherein the operations further include:
  with one or more shader routines executable on a graphics processing unit ("GPU"), performing one or more additional decoding workloads.

5. The computer system of claim 4, wherein:
  the first decoding workload includes bitstream parsing for the given picture, the bitstream parsing including the determining the boundaries, in the bitstream, for the units of encoded data;
  the second decoding workload includes, for one of the multiple independently-decodable spatial sections of the given picture, entropy decoding, preparation for inverse quantization, preparation for inverse frequency transforms, preparation for spatial prediction, preparation for motion compensation, inverse quantization, inverse frequency transforms, spatial prediction, and motion compensation; and the one or more additional decoding workloads include post-processing for the given picture.

6. The computer system of claim 4, wherein:

the first decoding workload includes bitstream parsing for the given picture, the bitstream parsing including the determining the boundaries, in the bitstream, for the units of encoded data;

the second decoding workload includes, for one of the multiple independently-decodable spatial sections of the given picture, entropy decoding, preparation for inverse quantization, preparation for inverse frequency transforms, preparation for spatial prediction, and preparation for motion compensation; and the one or more additional decoding workloads include inverse quantization, inverse frequency transforms, spatial prediction, motion compensation, and post-processing for the given picture.

7. The computer system of claim 1, wherein:

the browser is configured to execute the first script as part of foreground processing.

8. The computer system of claim 1, wherein the operations further include:

passing, for the transferring the units of encoded data, at least some results of the first decoding workload, as one or more input messages, from the browser to the auxiliary processes; and passing at least some of the results of the second decoding workload, as one or more output messages, from the auxiliary processes, respectively, to the browser.

9. The computer system of claim 8, wherein the operations further include:

with each of the auxiliary threads, serializing the at least some of the results of the second decoding workload, according to a format, in the one or more output messages.

10. The computer system of claim 8, wherein the operations further comprise:

with the main thread, performing the aggregating the results of the performing the second decoding workload for the at least some of the multiple independently-decodable spatial sections, respectively, of the given picture;

transferring the aggregated results to a graphics processing unit ("GPU"); and with one or more shader routines executable on the GPU, performing one or more additional decoding workloads on the transferred results.

11. The computer system of claim 10, wherein the aggregated results include entropy-decoded transform coefficients, mode information, and motion information for the multiple independently-decodable spatial sections, respectively, of the given picture, and wherein the one or more additional decoding workloads include inverse quantization, inverse frequency transforms, spatial prediction, motion compensation, and post-processing for the given picture.

12. The computer system of claim 10, wherein the aggregated results include reconstructed content for the at least some of the multiple independently-decodable spatial sections, respectively, of the given picture, and wherein the one or more additional decoding workloads include post-processing for the given picture.

13. The computer system of claim 1, wherein the operations further include:

passing, for the transferring the units of encoded data, at least some results of the first decoding workload, as one or more input messages, from the browser to the auxiliary processes;

from each of the auxiliary processes, transferring at least some of the results of the performing the second decoding workload to a graphics processing unit ("GPU"); and with one or more shader routines executable on the GPU, performing one or more additional decoding workloads on the transferred results, wherein the aggregating includes compositing reconstructed content for the at least some of the multiple independently-decodable spatial sections into a reconstructed version of the given picture.

14. The computer system of claim 1, wherein the operations further include:

with the browser, initiating the auxiliary processes.

15. A method comprising:

receiving at least part of a bitstream of encoded data for one or more pictures of a video sequence; and with a browser-based video decoder, performing operations to decode the encoded data and reconstruct the one or more pictures of the video sequence, the operations including:

with a main thread that is executable on a first CPU of the multiple CPUs, performing a first decoding workload for a given picture of the one or more pictures, wherein a first script specifies the first decoding workload, wherein the main thread is associated with a browser configured to execute the first script, the first decoding workload including determining boundaries, in the bitstream, for units of encoded data for multiple independently-decodable spatial sections, respectively, of the given picture, and wherein the multiple independently-decodable spatial sections are multiple slices, multiple tiles, or multiple segments of blocks of the given picture;

transferring the units of encoded data to auxiliary processes of the browser-based video decoder for parallel decoding of different spatial sections among the multiple independently-decodable spatial sections of the given picture;

with each of multiple auxiliary threads, performing a second decoding workload for a different spatial section, among the multiple independently-decodable spatial sections, of the given picture using the transferred unit of encoded data for the different spatial section, the auxiliary threads each being executable simultaneously on a different CPU of the multiple CPUs, wherein a second script, different than the first script, specifies the second decoding workload, and wherein the auxiliary threads are associated with the auxiliary processes, respectively, which are configured to execute the second script as Web workers as part of background processing; and aggregating results, from the multiple auxiliary threads, of the performing the second decoding workload for at least some of the multiple independently-decodable spatial sections, respectively, of the given picture.

16. One or more computer-readable media storing computer-executable instructions for causing a computer system, when programmed thereby, to perform operations with a browser-based video decoder to decode encoded data for one or more pictures of a video sequence and reconstruct the one or more pictures of the video sequence, the computer-executable instructions comprising:

a first script, executable with a main thread on a first central processing unit ("CPU") of multiple CPUs of the computer system, that specifies a first decoding workload for a given picture of the one or more pictures, wherein the main thread is associated with a browser configured to execute the first script, the first decoding workload including determining boundaries, in the bitstream, for units of encoded data for multiple independently-decodable spatial sections, respectively, of the given picture, and wherein the multiple independently-decodable spatial sections are multiple slices, multiple tiles, or multiple segments of blocks of the given picture;

code for transferring the units of encoded data to auxiliary processes of the browser-based video decoder for parallel decoding of different spatial sections among the multiple independently-decodable spatial sections of the given picture;

a second script, simultaneously executable with multiple auxiliary threads on different CPUs, respectively, of the multiple CPUs, that specifies a second decoding workload for a given spatial section among the multiple independently-decodable spatial sections of the given picture using the transferred unit of encoded data for the given spatial section, the second script being different than the first script, wherein the auxiliary threads are associated with the auxiliary processes, respectively, which are configured to execute the second script as Web workers as part of background processing; and code for aggregating results, from the multiple auxiliary threads, of performing the second decoding workload for at least some of the multiple independently-decodable spatial sections, respectively, of the given picture.

17. The one or more computer-readable media of claim 16, wherein the computer-executable instructions further comprise:

one or more shader routines, executable on a graphics processing unit ("GPU"), that specify one or more additional decoding workloads.

18. The method of claim 15, wherein:
the browser is configured to execute the first script as part of foreground processing.

19. The method of claim 15, wherein the operations further include:

passing, for the transferring the units of encoded data, at least some results of the first decoding workload, as one or more input messages, from the browser to the auxiliary processes; and passing at least some of the results of the second decoding workload, as one or more output messages, from the auxiliary processes, respectively, to the browser.

20. The method of claim 19, wherein the operations further comprise:

with the main thread, performing the aggregating the results of the performing the second decoding workload for the at least some of the multiple independently-decodable spatial sections, respectively, of the given picture;

transferring the aggregated results to a graphics processing unit ("GPU"); and with one or more shader routines executable on the GPU, performing one or more additional decoding workloads on the transferred results.

21. The method of claim 15, wherein the operations further include:

passing, for the transferring the units of encoded data, at least some results of the first decoding workload, as one or more input messages, from the browser to the auxiliary processes;

from each of the auxiliary processes, transferring at least some of the results of the second decoding workload to a graphics processing unit ("GPU"); and with one or more shader routines executable on the GPU, performing one or more additional decoding workloads on the transferred results, wherein the aggregating includes compositing reconstructed content for the at least some of the multiple independently-decodable spatial sections into a reconstructed version of the given picture.

22. The method of claim 15, wherein:
the first decoding workload includes bitstream parsing for the given picture, the bitstream parsing including the determining the boundaries, in the bitstream, for the units of encoded data; and the second decoding workload includes, for one of the multiple independently-decodable spatial sections of the given picture, entropy decoding, preparation for inverse quantization, preparation for inverse frequency transforms, preparation for spatial prediction, preparation for motion compensation, inverse quantization, inverse frequency transforms, spatial prediction, and motion compensation.

23. The method of claim 15, wherein the operations further comprise:

with one or more shader routines executable on a graphics processing unit ("GPU"), performing one or more additional decoding workloads.

24. The method of claim 23, wherein:
the first decoding workload includes bitstream parsing for the given picture, the bitstream parsing including the determining the boundaries, in the bitstream, for the units of encoded data;

the second decoding workload includes, for one of the multiple independently-decodable spatial sections of the given picture, entropy decoding, preparation for inverse quantization, preparation for inverse frequency transforms, preparation for spatial prediction, preparation for motion compensation, inverse quantization, inverse frequency transforms, spatial prediction, and motion compensation; and the one or more additional decoding workloads include post-processing for the given picture.

25. The method of claim 23, wherein:
the first decoding workload includes bitstream parsing for the given picture, the bitstream parsing including the determining the boundaries, in the bitstream, for the units of encoded data;

the second decoding workload includes, for one of the multiple independently-decodable spatial sections of the given picture, entropy decoding, preparation for inverse quantization, preparation for inverse frequency transforms, preparation for spatial prediction, and preparation for motion compensation; and the one or more additional decoding workloads include inverse quantization, inverse frequency transforms, spatial prediction, motion compensation, and post-processing for the given picture.

26. The method of claim 19, wherein the operations further comprise:

with each of the auxiliary threads, serializing the at least some of the results of the second decoding workload, according to a format, in the one or more output messages.

\* \* \* \* \*